United States Patent
Chen et al.

(10) Patent No.: US 10,051,282 B2
(45) Date of Patent: Aug. 14, 2018

(54) METHOD FOR OBTAINING MOTION INFORMATION WITH MOTION VECTOR DIFFERENCES

(71) Applicant: SAMSUNG ELECTRONICS CO., LTD., Suwon-si (KR)

(72) Inventors: Jie Chen, Beijing (CN); Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 14/898,291

(22) PCT Filed: Jun. 13, 2014

(86) PCT No.: PCT/KR2014/005226
§ 371 (c)(1),
(2) Date: Dec. 14, 2015

(87) PCT Pub. No.: WO2014/200313
PCT Pub. Date: Dec. 18, 2014

(65) Prior Publication Data
US 2016/0134886 A1    May 12, 2016

(30) Foreign Application Priority Data
Jun. 14, 2013    (CN) .......................... 2013 1 0236309

(51) Int. Cl.
*H04N 7/12*    (2006.01)
*H04N 19/52*   (2014.01)
(Continued)

(52) U.S. Cl.
CPC ........... *H04N 19/52* (2014.11); *H04N 19/136* (2014.11); *H04N 19/176* (2014.11); *H04N 19/44* (2014.11); *H04N 19/503* (2014.11)

(58) Field of Classification Search
CPC ...................................................... H04N 19/52
(Continued)

(56) References Cited

U.S. PATENT DOCUMENTS

2006/0153300 A1    7/2006 Wang et al.
2011/0080954 A1    4/2011 Bossen et al.
(Continued)

FOREIGN PATENT DOCUMENTS

KR    10-2012-0026092 A    3/2012

OTHER PUBLICATIONS

Search Report dated Sep. 18, 2014 issued by the International Searching Authority in counterpart International Patent Application No. PCT/KR2014/005226 (PCT/ISA/210).
(Continued)

*Primary Examiner* — Richard Torrente
(74) *Attorney, Agent, or Firm* — Sughrue Mion, PLLC

(57) ABSTRACT

Provided is a method for obtaining motion information in video encoding/decoding, which includes calculating a first predictor of a motion vector of a current block/sub-block according to a motion vector of each reference block in a first reference block set of the current block/sub-block; determining a first motion vector difference between a motion vector of each reference block in a second reference block set of the current block/sub-block and a first predictor of the motion vector of the reference block in the second reference block set of the current block/sub-block; predicting a first motion vector difference between the motion vector of the current block/sub-block and the first predictor of the motion vector of the current block/sub-block according to the first motion vector difference of each reference block in the second reference block set to obtain a predictor of the first motion vector difference of the current block/sub-block; and determining a second predictor of the motion
(Continued)

vector of the current block/sub-block according to the predictor of the first motion vector difference of the current block/sub-block and the first predictor of the motion vector of the current block/sub-block. The method makes it possible to improve encoding/decoding performance.

15 Claims, 15 Drawing Sheets

(51) Int. Cl.
    *H04N 19/503*     (2014.01)
    *H04N 19/136*     (2014.01)
    *H04N 19/176*     (2014.01)
    *H04N 19/44*     (2014.01)

(58) Field of Classification Search
    USPC ................................. 375/240.08
    See application file for complete search history.

(56) References Cited

U.S. PATENT DOCUMENTS

| | | | |
|---|---|---|---|
| 2011/0170601 A1* | 7/2011 | Kim | H04N 19/105 |
| | | | 375/240.16 |
| 2012/0106645 A1 | 5/2012 | Lin et al. | |
| 2012/0128060 A1 | 5/2012 | Lin et al. | |
| 2013/0003851 A1* | 1/2013 | Yu | H04N 19/105 |
| | | | 375/240.16 |

OTHER PUBLICATIONS

Written Opinion dated Sep. 18, 2014 issued by the International Searching Authority in counterpart International Patent Application No. PCT/KR2014/005226 (PCT/ISA/237).

\* cited by examiner

METHOD FOR OBTAINING MOTION INFORMATION WITH MOTION VECTOR DIFFERENCES

TECHNICAL FIELD

The present invention relates to a method for obtaining motion information in video encoding/decoding.

BACKGROUND ART

Commonly used video encoding/decoding technologies are all based on a hybrid framework, and main coding tools include prediction coding, transform coding, and entropy coding. The prediction coding includes inter-frame prediction coding and intra-frame prediction coding, which remove correlation of video signals in time-domain and correlation of video signals in space-domain respectively.

The inter-frame prediction coding may predict an image of a currently-coded frame according to an image of a coded frame. The prediction residuals are transformed and entropy coded. The coded frame for predicting the currently-coded frame is called a reference frame. A space location relationship between a prediction block on the reference frame and a currently-coded block may be decoded into a motion vector.

With the development of prediction technologies, prediction residuals of an image have been reduced. Accordingly, the proportion of prediction residual information of the image is decreased and the proportion of motion information is increased accordingly in a bit-stream. The efficient coding of a motion vector is important to the performance of video coding.

There are two methods of processing the motion vector in video encoding/decoding. In a first method, an encoder predicates the motion vector after obtaining the motion vector through motion estimation, and then writes a motion vector difference between the motion vector and a predictor of the motion vector to the bit-stream. A decoder predicates the motion vector with the same method, and then reconstructs the motion vector according to the predictor of the motion vector and the motion vector difference read from the bit-stream. In a second method, the encoder/decoder directly derives the motion vector with the same method. In the case of the second method, it is not needed to transmit the motion vector difference in the bit-stream. However, no matter which method is adopted, the motion information needs to be derived. The derived motion information may be the predictor of the motion vector, or the motion vector, or a candidate of the motion vector, or a candidate of the predictor of the motion vector.

In H.264/Advanced Video Coding (AVC), the motion vector is predicted with a median prediction method in an inter-frame prediction mode. In the median prediction method, three coded blocks adjacent to the currently-coded block are selected, a median among horizontal components of motion vectors of the three coded blocks and a median among vertical components of the motion vectors of the three coded blocks are respectively taken as a horizontal component and a vertical component of the predictor of the motion vector of the currently-coded block. In a temporal direct mode, a motion vector of a block on the reference frame that has the same space location as the currently-coded block is scaled and then taken as the motion vector of the currently-coded block.

In Audio Video coding Standard (AVS), the motion vector is predicted with a distance median method in the inter-frame prediction mode. In the distance median method, three coded blocks adjacent to the currently-coded block in space are selected, a distance between each two of motion vectors of the three coded blocks is calculated, and a motion vector corresponding to a median of the calculated distances is taken as the predictor of the motion vector of the currently-coded block. In the temporal direct mode, a motion vector of a block on the reference frame that has the same space location as the currently-coded block is scaled and then taken as the motion vector of the currently-coded block.

In the latest international video coding standard, High Efficiency Video Coding (HEVC), a motion vector competition scheme was introduced. In the motion vector competition scheme, a candidate motion vector set is derived according to a rule, and then an optimal candidate motion vector is selected from the candidate motion vector set and is taken as the predictor of the motion vector of the currently-coded block. Then, the selected motion vector is transmitted in the bit-stream. The candidate motion vector set may include spatial candidate motion vectors and temporal candidate motion vectors. The spatial candidate motion vectors may be selected according to a certain order and priority from motion vectors of upper blocks and left blocks that are adjacent to the currently-coded block. The temporal candidate motion vectors may be selected according to a certain order and priority from motion vectors of blocks on the reference frame that have the same space location as the currently-coded block in space or are adjacent to the currently-coded block in space.

In conventional technologies, the motion vector is derived or predicted only once, and a derived or predicted value is taken as a final motion vector or predictor. However, motion vector differences of blocks that are spatially or temporally adjacent to each other still have correlation, and the correlation between the motion vector differences is not utilized in a conventional video encoding/decoding method. For example, in the motion vector prediction or derivation method based on median or distance, only motion vectors of blocks that are located at the same frame as the currently-coded block are considered, and thus only the correlation between motion vectors in space-domain may be eliminated. However, the motion vector differences still have the correlation between motion vectors in time-domain. In the temporal direct mode of H.264/AVC and AVS, the motion vector derivation method only considers motion vectors of blocks on the reference frame that are located at the same space location as the currently-coded block. The motion vectors derived through this method only exploit temporal correlation but do not consider the correlation between the currently-coded block and the blocks that are adjacent to currently-coded block in the same frame. Accordingly, the derived motion vectors are not optimal. In the motion vector prediction and derivation method based on the competition scheme in HEVC, though both the temporal candidate motion vector and the spatial candidate motion vector are included in the candidate motion vector set and an optimal motion vector is selected, motion vector differences of adjacent blocks still have correlation.

DETAILED DESCRIPTION OF THE INVENTION

Technical Problem

An embodiment of the present invention provides a method for obtaining motion information in video encoding/ decoding, including a method for determining motion information of a current block or a sub-block of a video image.

Another embodiment of the present invention provides an apparatus for obtaining motion information in video encoding/decoding.

Technical Solution

The present invention provides a method and apparatus for obtaining motion information in video encoding/decoding. With the method and apparatus, encoding performance may be improved. The solution of the present invention is implemented as follows.

A method for obtaining motion information in video encoding/decoding includes a process of determining motion information of a current block/sub-block in a video image. The process includes: calculating a first predictor of a motion vector of the current block/sub-block according to a motion vector of each reference block in a first reference block set of the current block/sub-block; determining a first motion vector difference between a motion vector of each reference block in a second reference block set of the current block/sub-block and a first predictor of the motion vector of the reference block in the second reference block set of the current block/sub-block, and predicting a first motion vector difference between the motion vector of the current block/sub-block and the first predictor of the motion vector of the current block/sub-block according to the first motion vector difference of each reference block in the second reference block set so as to obtain a predictor of the first motion vector difference of the current block/sub-block; and determining a second predictor of the motion vector of the current block/sub-block according to the predictor of the first motion vector difference of the current block/sub-block and the first predictor of the motion vector of the current block/sub-block, wherein the first reference block set includes reference blocks for predicting or deriving the motion vector of the current block/sub-block for the first time, and the second reference block set includes reference blocks for predicting the first motion vector difference of the current block/sub-block.

The first reference block set of the current block includes an encoded/decoded block on a current frame that is adjacent to the current block, or an encoded/decoded block on a reference frame of the current frame that overlaps with or is adjacent to the current block in space; the second reference block set of the current block includes an encoded/decoded block on the current frame that is adjacent to the current block, or an encoded/decoded block on the reference frame of the current frame that overlaps with or is adjacent to the current block in space; the first reference block set of the current sub-block includes an encoded/decoded block on the current frame that is adjacent to the current sub-block or the block of the current sub-block, or an encoded/decoded block on the reference frame of the current frame that overlaps or is adjacent to the current sub-block or the block of the current sub-block in space; and the second reference block set of the current sub-block includes an encoded/decoded block on the current frame that is adjacent to the current sub-block or the block of the current sub-block, or an encoded/decoded block on the reference frame of the current frame that overlaps or is adjacent to the current sub-block or the block of the current sub-block in space.

The calculating of the first predictor of the motion vector of the current block/sub-block includes: deriving, by an encoder, the first predictor of the motion vector of the current block/sub-block according to the motion vector of each reference block in the first reference block set of the current block/sub-block, and writing derivation information of the motion vector of the first predictor of the motion vector of the current block/sub-block to a bit-stream; and deriving, by a decoder, the first predictor of the motion vector of the current block/sub-block according to the motion vector of each reference block in the first reference block set of the current block/sub-block and the derivation information of the first predictor of the motion vector of the current block/sub-block in the bit-stream.

The determining of the first motion vector difference between the motion vector of each reference block in the second reference block set of the current block/sub-block and the first predictor of the motion vector of the reference block in the second reference block set of the current block/sub-block includes: when the motion information of the current block/sub-block is determined, obtaining the motion vector of each reference block in the second reference block set and a first predictor of the motion vector of the reference block in the second reference block set, and taking a difference between the motion vector of the reference block in the second reference block set and the first predictor of the motion vector of the reference block in the second reference block set as the first motion vector difference of the reference block in the second reference block set of the current block/sub-block; for each reference block in the second reference block set of the current block/sub-block, after motion information of the reference block is determined and before motion information of a following processed block/sub-block of the reference block is determined, taking a difference between a motion vector of the reference block and a first predictor of the motion vector of the reference block as the first motion vector difference of the reference block and storing the first motion vector difference of the reference block; when the motion information of the current block/sub-block is determined, obtaining the stored first motion vector difference of each reference block in the second reference block set.

When a motion vector of a reference block in the second reference block set of the current block/sub-block or a predictor of the motion vector of the reference block in the second reference block set of the current block/sub-block is inexistent, the method includes: determining that a first motion vector difference of the reference block is inexistent, when the first motion vector difference of the reference block is not to be used for calculating the predictor of the first motion vector difference of the current block/sub-block; or configuring the first motion vector difference of the reference block as a zero vector, when the first motion vector difference of the reference block is to be used for calculating the predictor of the first motion vector difference of the current block/sub-block.

When a first motion vector difference of a reference block in the second reference block set of the current block/sub-block is inexistent, the method includes configuring the predictor of the first motion vector difference of the current block/sub-block as a zero vector; or when first motion vector differences of all reference blocks in the second reference block set of the current block/sub-block are inexistent, the method includes configuring the predictor of the first motion vector difference of the current block/sub-block as a zero vector.

The predicting of the first motion vector difference of the current block/sub-block includes: taking a minimum value among horizontal components of first motion vector differences of the reference blocks in the second reference block set as a horizontal component of the predictor of the first motion vector difference of the current block/sub-block, and taking a minimum value among vertical components of the first motion vector differences of the reference blocks in the second reference block set as a vertical component of the predictor of the first motion vector difference of the current block/sub-block; or taking an average of first motion vector differences of the reference blocks in the second reference block set as the predictor of the first motion vector difference of the current block/sub-block; or taking a median among horizontal components of first motion vector differences of the reference blocks in the second reference block set as a horizontal component of the predictor of the first motion vector difference of the current block/sub-block, and taking a median among vertical components of the first motion vector differences of the reference blocks in the second reference block set as a vertical component of the predictor of the first motion vector difference of the current block/sub-block; or calculating a distance between each two of first motion vector differences of the reference blocks in the second reference block set, and deriving the predictor of the first motion vector difference of the current block/sub-block according to the distances; or deriving, by an encoder, the predictor of the first motion vector difference of the current block/sub-block according to the first motion vector difference of each reference block in the second reference block set, writing the derivation information of the predictor of the first motion vector difference of the current block/sub-block to a bit-stream; and deriving, by a decoder, the predictor of the first motion vector difference of the current block/sub-block according to the first motion vector difference of each reference block in the second reference block set and the derivation information of the predictor of the first motion vector difference of the current block/sub-block in the bit-stream.

The determining of the second predictor of the motion vector of the current block/sub-block includes: taking a sum of the predictor of the first motion vector difference of the current block/sub-block and the first predictor of the motion vector of the current block/sub-block or a weighted sum of the predictor of the first motion vector difference of the current block/sub-block and the first predictor of the motion vector of the current block/sub-block as the second predictor of the motion vector of the current block/sub-block.

The reference blocks in the first reference block set of the current block/sub-block are equal to or different from the reference blocks in the second reference block set of the current block/sub-block.

For different sub-blocks within a block, reference blocks in a first reference block set of a sub-block are equal to or different from reference blocks in a first reference block set of another sub-block, and reference blocks in a second reference block set of a sub-block are equal to or different from reference blocks in a second reference block set of another sub-block.

When motion information of a reference block in the first reference block set or the second reference block set is determined in sub-block, the reference block is a sub-block.

An apparatus for obtaining motion information in video encoding/decoding includes; an inputting unit that obtains a motion vector of each reference block in a first reference block set of a current block/sub-block, and determines a first motion vector difference between a motion vector of each reference block in a second reference block set of the current block/sub-block and a first predictor of the motion vector of the reference block in the second reference block set of the current block/sub-block; a predicting unit that calculates the first predictor of the motion vector of the current block/sub-block according to the motion vector of each reference block in the first reference block set, and predicts the first motion vector difference of the current block/sub-block according to the first motion vector difference of each reference block in the second reference block set so as to obtain the predictor of the first motion vector difference of the current block/sub-block; and a calculating unit that determines a second predictor of the motion vector of the current block/sub-block according to the predictor of the first motion vector difference of the current block/sub-block and the first predictor of the motion vector of the current block/sub-block, wherein the first reference block set includes reference blocks for predicting or deriving a motion vector of the current block/sub-block for the first time and the second reference block set includes reference blocks for predicting a first motion vector difference of the current block/sub-block.

As can be seen from the above solution, the motion vector of the current block/sub-block is predicted to obtain the first predictor of the motion vector of the current block/sub-block. Then the first motion vector difference of the current block/sub-block is predicted according to the first motion vector differences of reference blocks in the second reference block set so as to derive the predictor of the first motion vector difference of the current block/sub-block. Afterwards, the second predictor of the motion vector of the current block/sub-block is obtained according to the predictor of the first motion vector difference of the current block/sub-block and the first predictor of the motion vector of the current block/sub-block, and may be taken as the final predictor of the motion vector of the current block/sub-block, a candidate of the predictor of the motion vector of the current block/sub-block, the motion vector of the current block/sub-block, or a candidate of the motion vector of the current block/sub-block. According to the above-described method, the correlation between motion vector differences of the reference block and the current block/sub-block may be fully utilized to estimate the motion vector difference of the current block/sub-block, and further correct the first predictor of the motion vector of the current block/sub-block to obtain the accurate second predictor of the motion vector of the current block/sub-block, thereby greatly improving the accuracy of motion information and encoding performance.

Advantageous Effects of the Invention

In the conventional video encoding/decoding method, the motion vector is derived or predicted only once. However, motion vector differences of blocks that are spatially or temporally adjacent still have correlation. Accordingly, the present invention may derive or predict a motion vector more accurately by deriving or predicting the motion vector twice in order to fully utilize the correlation of motion vector differences.

BEST MODE

In order to make the object, technical solution and merits of the present invention clearer, the present invention will be described in detail with reference to the accompanying drawings.

Figure 1:
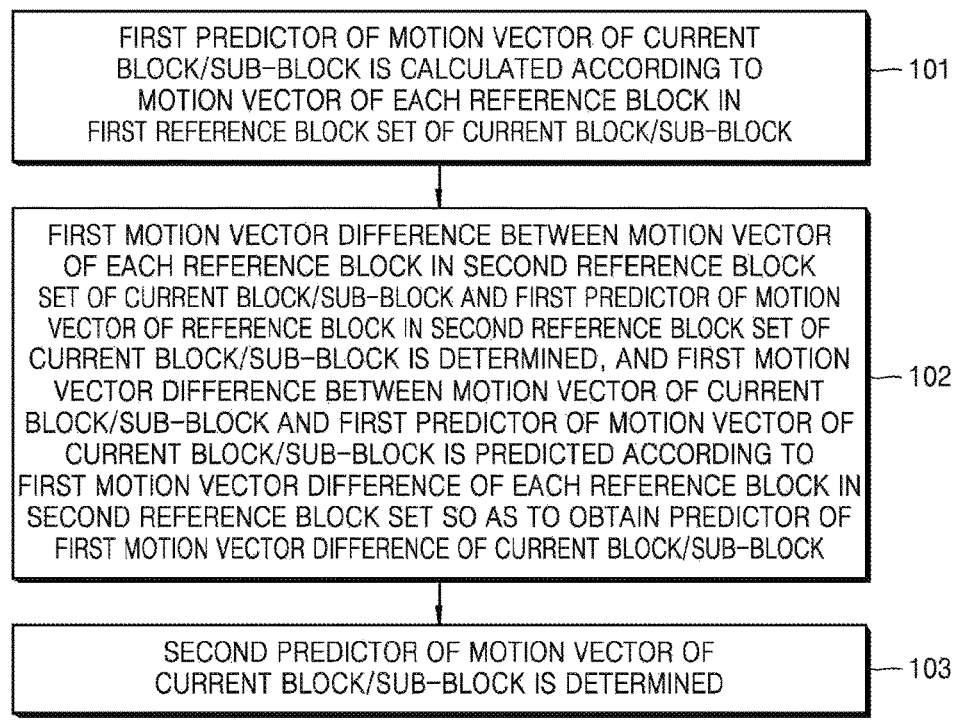
FIG. 1 is a flowchart of a method for obtaining a motion vector according to an embodiment of the present invention.

As mentioned in the background art, in the conventional video encoding/decoding method, the motion vector is derived or predicted only once. However, motion vector differences of blocks that are spatially or temporally adjacent to each other still have correlation. Accordingly, encoding performance may be improved by exploitation of the correlation. In order to fully utilize the correlation of motion vector differences, the present invention provides a method for obtaining a motion vector, as illustrated in FIG. 1.

At block 101, a first predictor of a motion vector of a current block/sub-block is calculated according to a motion vector of each reference block in a first reference block set of the current block/sub-block.

The first reference block set includes reference blocks for predicting or deriving the motion vector of the current block/sub-block for the first time.

At block 102, a first motion vector difference between a motion vector of each reference block in a second reference block set of the current block/sub-block and a first predictor of the motion vector of the reference block in the second reference block set of the current block/sub-block is determined. A first motion vector difference between the motion vector of the current block/sub-block and the first predictor of the motion vector of the current block/sub-block is predicted according to the first motion vector difference of each reference block in the second reference block set so as to obtain a predictor of the first motion vector difference of the current block/sub-block.

The second reference block set includes reference blocks for predicting the first motion vector difference of the current block/sub-block.

At block 103, a second predictor of the motion vector of the current block/sub-block is determined according to the predictor of the first motion vector difference of the current block/sub-block and the first predictor of the motion vector of the current block/sub-block.

Thus, the flowchart of the method for obtaining the motion information ends. The second predictor of the motion vector that is obtained in the above flowchart may be taken as the predictor of the motion vector of the current block/sub-block, a candidate of the predictor of the motion vector of the current block/sub-block, the motion vector of the current block/sub-block, or a candidate of the motion vector of the current block/sub-block, which may be used for encoding/decoding of the current block/sub-block. As can be seen from the above flowchart, the method for obtaining the motion information may be regarded as a secondary prediction or derivation method for the motion vector. In the process of prediction of the motion vector, the motion vector difference generated after the prediction of the motion vector for the first time may be predicted again to obtain the predictor of the motion vector difference. Then, the final predictor of the motion vector may be obtained according to the results of the two predictions. In the process of derivation of the motion vector, a derived value of the motion vector is first obtained, and a derived value of the motion vector difference is then obtained according to the information of first motion vector differences of adjacent blocks. A final derived variable of the motion vector is obtained according to the two derived values. In this way, the accuracy of the derived motion vector may be improved.

The predictor of the motion vector of the current block/sub-block that is obtained through the prediction process for the first time and the derived value of the motion vector of the current block/sub-block that is obtained through the derivation process for the first time are referred to as the first predictor of the motion vector. The estimation result of the motion vector that is obtained according to the results of two predictions or the two derivations in the present invention is referred to as the second predictor of the motion vector. A method for transmitting derivation information in a bit-stream may be adopted in the calculation of the first predictor of the motion vector of the current block/sub-block and/or the predictor of the first motion vector difference of the current block/sub-block. In this method, an encoder writes the derivation information of the first predictor of the motion vector and/or the derivation information of the predictor of the first motion vector difference to the bit-stream. A decoder calculates the first predictor of the motion vector and/or the predictor of the first motion vector difference according to the derivation information in the bit-stream.

Blocks of a current fame and a reference frame that are adjacent to or overlap the current block in space may be both used in the two prediction or derivation processes of the present invention, or may be respectively used in the two prediction or derivation processes of the present invention. Therefore, the spatial and temporal correlation of motion vectors of different blocks may be eliminated to maximum extent and the coding efficiency of motion vectors may be improved.

When a block is divided into multiple sub-blocks, the method for obtaining the motion information may be applied to each of the sub-blocks to obtain the motion information of each sub-block. The method for obtaining the motion information in block and in sub-block may be implemented according to embodiments of the present invention. The solution of the present invention will be described with reference to embodiments.

In first, second, third, and fourth embodiments, motion information is determined for a current block. A flowchart of deriving motion information of the current block is provided for each embodiment. In fifth and sixth embodiments, a current block is divided into multiple sub-blocks. Motion information is determined for each sub-block. A flowchart of deriving motion information for the sub-blocks is provided for each embodiment.

The first embodiment is described as follows.

Figure 2:
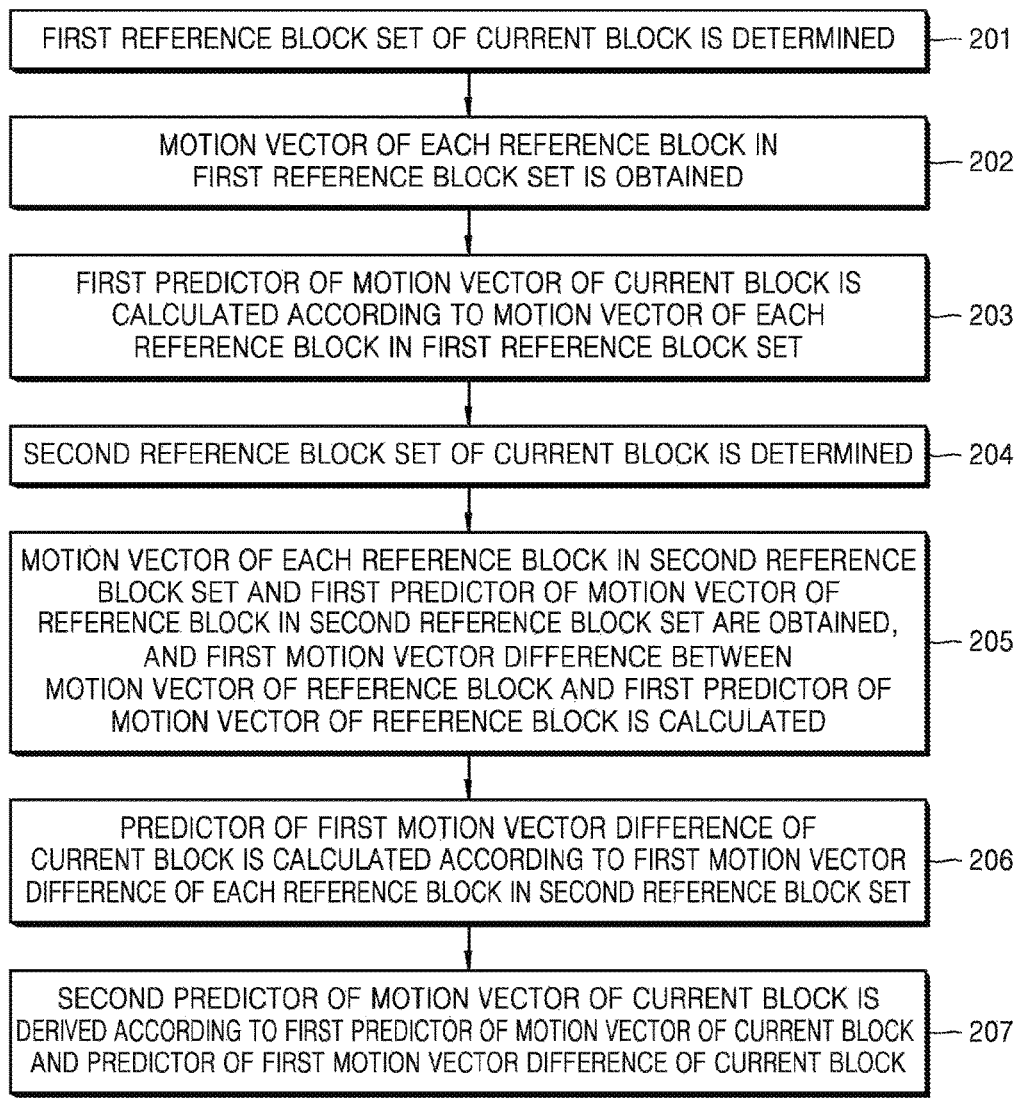
FIG. 2 is a flowchart of a first embodiment according to the present invention.
Figure 3:
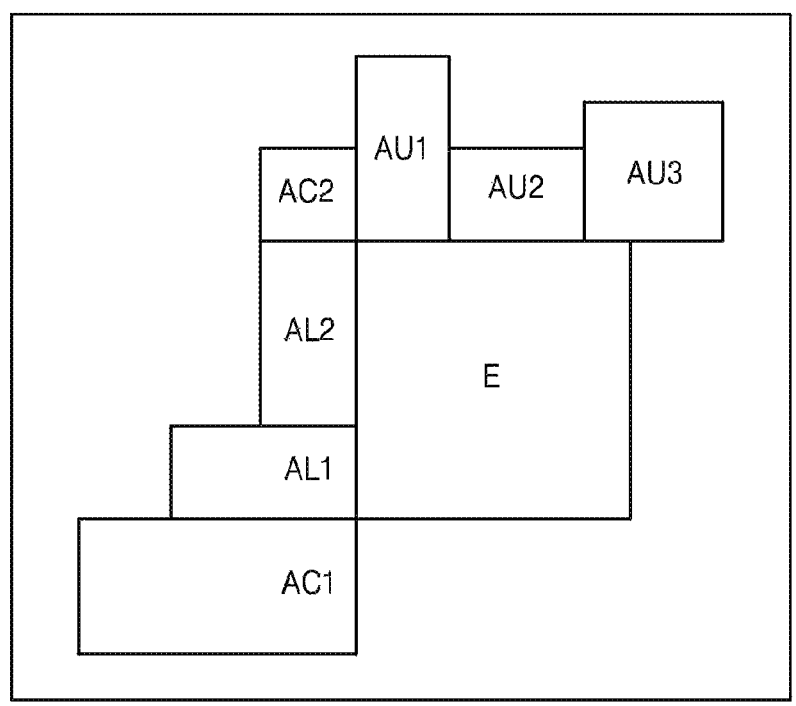
FIG. 3 is a schematic diagram illustrating reference blocks of a first category of a current block, according to an embodiment of the present invention.

FIG. 2 is a flowchart of the first embodiment according to the present invention. FIG. 3 is a schematic diagram illustrating reference blocks of a first category of a current block, according to an embodiment of the present invention. As illustrated in FIG. 2, a method for obtaining motion information according to the first embodiment includes following blocks.

At block 201, a first reference block set of a current block is determined.

In the present invention, the first reference block set and a second reference block set include at least one of a reference block of a first category and a reference block of a second category. The reference blocks of the first category are encoded/decoded blocks of a current frame that are adjacent to the current block. The reference blocks of the second category are encoded/decoded blocks of a reference frame that overlap or are adjacent to the current blocks in space.

In this embodiment, block 201 may be implemented as follows. The first reference block set only includes the reference blocks of the first category. As illustrated in FIG. 3, the reference blocks of the first category of the current block include AL1, AL2, AU1, AU2, AU3, AC1, and AC2. In this embodiment, reference blocks in the first reference block set of the current block may include an adjacent block AU1 located above the left upper vertex of the current block, an adjacent block AL2 located at the left side of the left upper vertex of the current block, and an adjacent block AC2 located at the left upper side of the left upper vertex of the current block.

At block 202, a motion vector of each reference block in the first reference block set is obtained.

When the motion vector of each reference block in the first reference block set is obtained at block 202, if the motion vector of a certain reference block in the first reference block set is inexistent, an indication for indicating that the motion vector of the reference block is inexistent is returned.

At block 203, a first predictor of a motion vector of the current block is calculated according to the motion vector of each reference block in the first reference block set that is obtained at block 202.

At block 203, the first predictor of the motion vector of the current block may be calculated according to the same method for predicting or deriving the motion vector of a current block as that used in a conventional encoding/decoding method.

Block 203 may be implemented as follows. An average value of horizontal components of the motion vectors obtained at block 202 and an average value of vertical components of the motion vectors obtained at block 202 are calculated respectively and are taken as the horizontal component of the predictor of the motion vector of the current block and the vertical component of the predictor of the motion vector of the current block. If a motion vector of a certain reference block in the first reference block set is inexistent, the inexistent motion vector is set to a zero vector.

Furthermore, a distance between a frame where a reference block in the first reference block set is located and a reference frame of the frame where the reference block in the first reference block set is located may be different from a distance between a frame where the current block is located and a reference frame of the frame where the current block is located. Accordingly, in order to improve encoding/decoding performance, the motion vector of the reference block in the first reference block set may be scaled according to the distance between the frame where the reference block in the first reference block set is located and the reference frame of the frame where the reference block in the first reference block set is located and the distance between the frame where the current block is located and the reference frame of the frame where the current block is located before the first predictor of the motion vector of the current block is determined at block 203. Then, the first predictor of the motion vector of the current block may be calculated according to the scaled motion vectors. In this way, the accuracy of the first predictor may be improved.

At block 204, a second reference block set of the current block is determined.

Block 204 may be implemented as follows. The second reference block set only includes reference blocks of the first category. As illustrated in FIG. 3, reference blocks of the first category of the current block include AL1, AL2, AU1, AU2, AU3, AC1, and AC2. In this embodiment, reference blocks in the second reference block set of the current block may include an adjacent block AU1 located above the left upper vertex of the current block, an adjacent block AL2 located at the left side of the left upper vertex of the current block, and an adjacent block AC2 located at the left upper side of the left upper vertex of the current block.

At block 205, a motion vector of each reference block in the second reference block set and a first predictor of the motion vector of the reference block in the second reference block set are obtained. A first motion vector difference between the motion vector of the reference block and the first predictor of the motion vector of the reference block is calculated.

When the motion vector of each reference block in the second reference block set and the first predictor of the motion vector of the reference block in the second reference block set are calculated at block 205, if a motion vector of a certain reference block or a first predictor of the motion vector of the reference block is inexistent, an indication for indicating that the first motion vector difference of the reference block is inexistent is returned.

Reference blocks in the second reference block set are all coded blocks. Thus, the motion vectors of the reference blocks in the second reference block set and the first predictors of the motion vectors of the reference blocks in the second reference block set have been generated. Herein, the motion vector of each reference block and the first predictor of the motion vector of the reference block are directly obtained. The first predictor of the motion vector of the reference block is subtracted from the motion vector of the reference block to obtain the first motion vector difference of the reference block.

Similar to block 203, a distance between a frame where a reference block in the second reference block set is located and a reference frame of the frame where the reference block in the second reference block set is located may be different from the distance between a frame where the current block is located and a reference frame of the frame where the current block is located. Accordingly, in order to improve encoding/decoding performance, the motion vector of the reference block in the second reference block set and the first predictor of the motion vector of the reference block in the second reference block set may be scaled according to the distance between the frame where the reference block in the second reference block set is located and the reference frame of the frame where the reference block in the second reference block set is located and the distance between the frame where the current block is located and the reference frame of the frame where the current block is located before the first motion vector difference of the reference block in the second reference block set is calculated at block 205. In this way, the accuracy of the first motion vector difference of the reference block in the second reference block set may be improved.

When a reference block A in the second reference block set is taken as the current block and the motion information of the reference block A is derived with reference to FIG. 2, if the motion vector of the reference block in the first reference block set of the reference block A is not scaled at block 203, a first predictor of a motion vector of the reference block A may be scaled according to the distance between the frame where the reference block in the first reference block set of the reference block A is located and the reference frame of the frame where the reference block in the first reference block set of the reference block A is located and the distance between the frame where the reference block A is located and the reference frame of the frame where the reference block A is located. Alternatively, when the reference block A in the second reference block set is taken as the current block and the motion information of the reference block A is derived with reference to FIG. 2, if a motion vector of a reference block B in the first reference block set of the reference block A is not scaled fully at block 203 (that is, a scale ratio cannot fully compensate a distance difference between the distance between the frame where the reference block A is located and the reference frame of the frame where the reference block A is located and the distance between the frame where the reference block B is located and the reference frame of the frame where the reference block B is located), the first predictor of the motion vector of the reference block A may be scaled to fully compensate the distance difference. Then, the scaling process in the above paragraph and calculation of the first motion vector difference of each reference block in the second reference block set may be applied to the scaled motion vectors.

At block 206, a predictor of the first motion vector difference of the current block is calculated according to the first motion vector difference of each reference block in the second reference block set that is obtained at block 205.

The first motion vector difference of the current block is predicted according to the first motion vector difference of the reference block in the second reference block set. A prediction method may be selected according to requirements. For example, weighted averaging the first motion vector differences of reference blocks, or selecting a median among horizontal components of the first motion vector differences of reference blocks and a median among vertical components of the first motion vector differences of reference blocks respectively, or the conventional motion vector prediction methods may be used.

In this embodiment, block 206 may be implemented as follows. A minimum value of first motion vector differences obtained at block 205 may be taken as the predictor of the first motion vector of the current block. If the first motion vector difference of a certain reference block in the second reference block set is inexistent, the first motion vector difference of the reference block may not be considered in the calculation process. If the first motion vector differences of reference blocks in the second reference block set are all inexistent, the predictor of the first motion vector difference of the current block may be set to a zero vector.

Similar to block 203, a distance between a frame where a reference block in the second reference block set is located and a reference frame of the frame where the reference block in the second reference block set is located may be different from the distance between a frame where the current block is located and a reference frame of the frame where the current block is located. Accordingly, if the motion vector of the reference block in the second reference block set and the first predictor of the motion vector of the reference block in the second reference block set are not scaled or are not scaled fully at block 205 according to the distance between the frame where the reference block in the second reference block set is located and the reference frame of the frame where the reference block in the second reference block set is located and the distance between the frame where the current block is located and the reference frame of the frame where the current block is located, the first motion vector difference of the reference block may be scaled according to the distance between the frame where the reference block in the second reference block set is located and the reference frame of the frame where the reference block in the second reference block set is located and the distance between the frame where the current block is located and the reference frame of the frame where the current block is located before the predictor of the first motion vector difference of the current block is calculated at block 206.

At block 207, a second predictor of the motion vector of the current block is derived according to the first predictor of the motion vector of the current block and the predictor of the first motion vector difference of the current block.

A method for determining the second predictor of the motion vector of the current block includes a method for performing a sum operation or a weighted sum operation on the first predictor of the motion vector of the current block and the predictor of the first motion vector difference of the current block.

Similar to block 203, the distance between the frames where the reference blocks in the two reference block sets are located and the reference frames of the frames where the reference blocks in the two reference block sets are located may be different from the distance between the frame where the current block is located and the reference frame of the frame where the current block is located. Accordingly, in order to improve encoding/decoding performance, if the motion vector of the reference block in the first reference block set or the first predictor of the motion vector of the current block is not scaled or is not scaled fully according to the distance between the frame where the reference block in the first reference block set is located and the reference frame of the frame where the reference block in the first reference block set is located and the distance between the frame where the current block is located and the reference frame of the frame where the current block is located, the first predictor of the motion vector of the current block may be scaled according to the distance between the frame where the reference block in the first reference block set is located and the reference frame of the frame where the reference block in the first reference block set is located and the distance between the frame where the current block is located and the reference frame of the frame where the current block is located before the second predictor of the motion vector of the current block is calculated at block 207. If the motion vector of the reference block in the second reference block set and the first predictor of the motion vector of the reference block in the second reference block set, or the first motion vector difference of the reference block in the second reference block set is not scaled or is not scaled fully according to the distance between the frame where the reference block in the first reference block set of the block in the second reference block set of the current block is located and the reference frame of the frame where the reference block in the first reference block set of the block in the second reference block set of the current block is located, the distance between the frame where the reference block in the second reference block set is located and the reference frame of the frame where the reference block in the second reference block set is located, and the distance between the frame where the current block is located and the reference frame of the frame where the current block is located, the predictor of the first motion vector difference of the current block may be scaled according to the distance between the frame where the reference block in the second reference block set is located and the reference frame of the frame where the reference block in the second reference block set is located and the distance between the frame where the current block is located and the reference frame of the frame where the current block is located before the second predictor of the motion vector of the current block is derived at block 207.

After the second predictor of the motion vector of the current block is determined at block 207, the second predictor of the motion vector of the current block may be taken as the predictor of the motion vector of the current block, a candidate of the predictor of the motion vector of the current block, the motion vector of the current block, or a candidate of the motion vector of the current block, which may be used for encoding/decoding of the current block.

The method flowchart provided in the first embodiment ends.

The second embodiment is described as follows.

Figure 4:
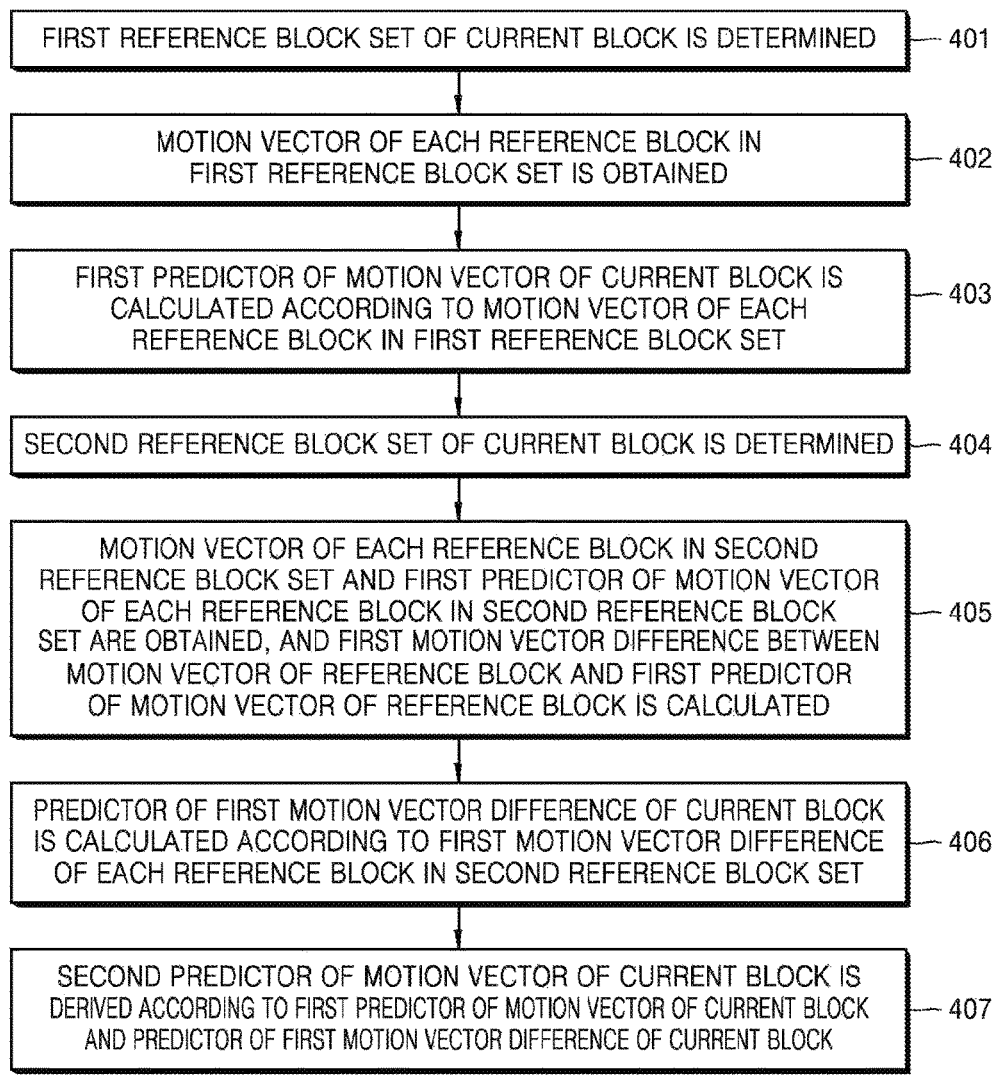
FIG. 4 is a flowchart of a second embodiment according to the present invention.
Figure 5:
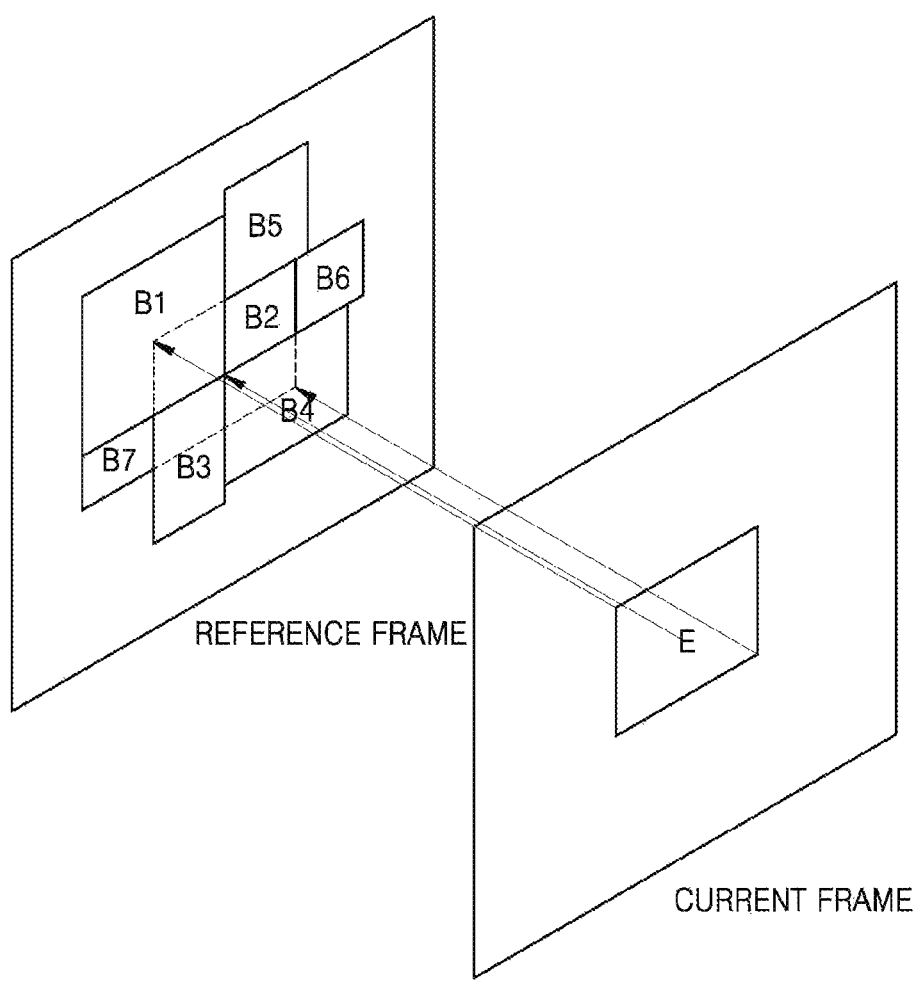
FIG. 5 is a schematic diagram illustrating reference blocks of a second category of a current block, according to an embodiment of the present invention.

FIG. 4 is a flowchart of the second embodiment according to the present invention. FIG. 3 is a schematic diagram illustrating reference blocks of a first category of a current block, according to an embodiment of the present invention. FIG. 5 is a schematic diagram illustrating reference blocks of a second category of a current block, according to an embodiment of the present invention. As illustrated in FIG. 4, a method for obtaining motion information is implemented as follows.

At block 401, a first reference block set of a current block is determined.

In this embodiment, block 401 may be implemented as follows. The first reference block set only includes the reference blocks of the first category. As illustrated in FIG. 3, the reference blocks of the first category of the current block include AL1, AL2, AU1, AU2, AU3, AC1, and AC2. In this embodiment, reference blocks in the first reference block set of the current block may include an adjacent block AU1 located above the left upper vertex of the current block, an adjacent block AL2 located at the left side of the left upper vertex of the current block, an adjacent block AC2 located at the left upper side of the left upper vertex of the current block, an adjacent block AU3 located at the right upper side of the right upper vertex of the current block.

At block 402, a motion vector of each reference block in the first reference block set is obtained.

When the motion vector of each reference block in the first reference block set is obtained at block 402, if the motion vector of a certain reference block in the first reference block set is inexistent, an indication for indicating that the motion vector of the reference block is inexistent is returned.

A conventional method for returning a motion vector may be adopted. The method for returning the motion vector may be implemented as follows. If the block AU3 has a motion vector, the motion vector of the block AU3 is returned and decoded into mv3, but the motion vector of the block AC2 is not returned. If the block AU3 has no motion vector but the block AC2 has a motion vector, the motion vector of the block AC2 is returned and decoded into mv3. If both the block AU3 and the block AC2 have no motion vector, a zero vector is returned and decoded into mv3. If the block AU1 has a motion vector, the motion vector of the block AU1 is returned and decoded into mv1. If the block AU2 has a motion vector, the motion vector of the block AU2 is returned and decoded into mv2. If the block AU1 has no motion vector, a zero vector is returned and decoded into mv1. If the block AU2 has no motion vector, a zero vector is returned and decoded into mv2. If a certain block is inexistent, it is deemed that the block has no motion vector. The processing method described herein may be applicable to other embodiments of the present invention.

At block 403, a first predictor of a motion vector of the current block is calculated according to the motion vector of each reference block in the first reference block set that is obtained at block 402.

The first predictor of the motion vector of the current block may be calculated according to the same method for predicting or deriving a motion vector of a current block as that used in a conventional encoding/decoding method.

Block 403 may be implemented as follows. A horizontal component and a vertical component of mv1 are respectively decoded into mv1_x and mv1_y, a horizontal component and a vertical component of mv2 are respectively decoded into mv2_x and mv2_y, and a horizontal component and a vertical component of mv3 are respectively decoded into mv3_x and mv3_y. If mv1_x and mv2_x have the same sign, an average of mv1_x and mv2_x is taken as a horizontal component of the first predictor of the motion vector of the current block. If mv1_x and mv2_x have different signs and mv1_x and mv3_x have the same sign, an average of mv1_x and mv3_x is taken as the horizontal component of the first predictor of the motion vector of the current block. If mv1_x and mv2_x have different signs and mv2_x and mv3_x have the same sign, an average of mv2_x and mv3_x is taken as the horizontal component of the first predictor of the motion vector of the current block. If mv1_y and mv2_y have the same sign, an average of mv1_y and mv2_y is taken as a vertical component of the first predictor of the motion vector of the current block. If mv1_y and mv2_y have different signs and mv1_y and mv3_y have the same sign, an average of mv1_y and mv3_y is taken as the vertical component of the first predictor of the motion vector of the current block. If mv1_y and mv2_y have different signs and mv2_y and mv3_y have the same sign, an average of mv2_y and mv3_y is taken as the vertical component of the first predictor of the motion vector of the current block. When a first predictor of a motion vector of a certain reference block is inexistent, the motion vector of the reference block is set to a zero vector.

In this embodiment, after the motion vector of the current block and the first predictor of the motion vector of the current block are determined, a first motion vector difference of the current block may be calculated. In this way, when the current block is taken as a reference block in the second reference block set of a subsequently processed block, the first motion vector difference of the reference block may be directly obtained.

Similar to the first embodiment, the motion vector may be scaled at block 403, which is not described herein.

At block 404, a second reference block set of the current block is determined.

Block 404 may be implemented as follows. The second reference block set includes the reference blocks of the first category and the reference blocks of the second category. As illustrated in FIG. 3, the reference blocks of the first category of the current block include AL1, AL2, AU1, AU2, AU3, AC1, and AC2. In this embodiment, the reference blocks of the first category in the second reference block set of the current block may include an adjacent block AU1 located above the left upper vertex of the current block, an adjacent block AL2 located at the left side of the left upper vertex of the current block, and an adjacent block AC2 located at the left upper side of the left upper vertex of the current block. As illustrated in FIG. 5, the reference blocks of the second category of the current block include B1, B2, B3, B4, B5, B6, and B7. B1, B2, B3, and B4 overlap the current block in space. B5, B6, and B7 are adjacent to the current block in space. In this embodiment, the reference blocks of the second category in the second reference block set of the current block may include B1 covering a point that has the same space location as the left upper vertex of the current block and B4 covering a point that has the same space location as the right bottom vertex of the current block.

At block 405, a first motion vector difference between a motion vector of each reference block in the second reference block set and a first predictor of the motion vector of the reference block in the second reference block set is obtained.

In this embodiment, after the motion vector of the current block and the first predictor of the motion vector of the current block are determined, a first motion vector difference between the motion vector of the current block and the first predictor of the motion vector of the current block is calculated and stored. In block 405, reference blocks in the second reference block set are all encoded blocks. The first motion vector difference of each reference block in the second reference block set is generated and stored. Accordingly, the first motion vector difference of each reference block in the second reference block set may be directly obtained.

When the first motion vector difference of each reference block in the second reference block set is obtained at block 405, if a first motion vector difference of a certain reference block is inexistent, an indication for indicating that the first motion vector difference of the reference block is inexistent is returned.

At block 406, a predictor of the first motion vector difference of the current block is calculated according to the first motion vector difference of each reference block in the second reference block set that is calculated at block 405.

Block 406 may be implemented as follows. An encoder selects one of the zero vector and the existent first motion vector differences as the predictor of the first motion vector difference of the current block. Then, an index of the selected value is written to a bit-stream. A decoder selects a correct value according to the index in the bit-stream from the zero vector and the existent first motion vector differences that are obtained at block 405. The decoder takes the selected value as the predictor of the first motion vector difference of the current block. The index transmitted in the bit-stream may be taken as the derivation information of the predictor of the first motion vector difference of the current block mentioned in the method for transmitting derivation information in a bit-stream to calculate the predictor of the first motion vector difference in the description of FIG. 1.

Similar to the first embodiment, the first motion vector difference may be scaled at block 406.

At block 407, a second predictor of the motion vector of the current block is derived according to the first predictor of the motion vector of the current block and the predictor of the first motion vector difference of the current block.

Although not described herein, block 407 is the same as block 207 of the first embodiment.

After the second predictor of the motion vector of the current block is determined at block 407, the second predictor of the motion vector of the current block may be taken as the predictor of the motion vector of the current block, a candidate of the predictor of the motion vector of the current block, the motion vector of the current block, or a candidate of the motion vector of the current block, which may be used for encoding/decoding of the current block.

The method flowchart provided in the second embodiment ends.

In the above two embodiments, the first predictor of the motion vector of the current block is first calculated. Then, the predictor of the first motion vector difference of the current block is calculated. In actual applications, the first predictor of the motion vector of the current block and the predictor of the first motion vector difference of the current block may be simultaneously obtained. Alternatively, the predictor of the first motion vector difference of the current block may be calculated, and then, the first predictor of the motion vector of the current block may be calculated. In the methods of obtaining motion information according to the third and fourth embodiments, the predictor of the first motion vector difference of the current block is first calculated and the first predictor of the motion vector of the current block is then calculated.

The third embodiment is described as follows.

Figure 6:
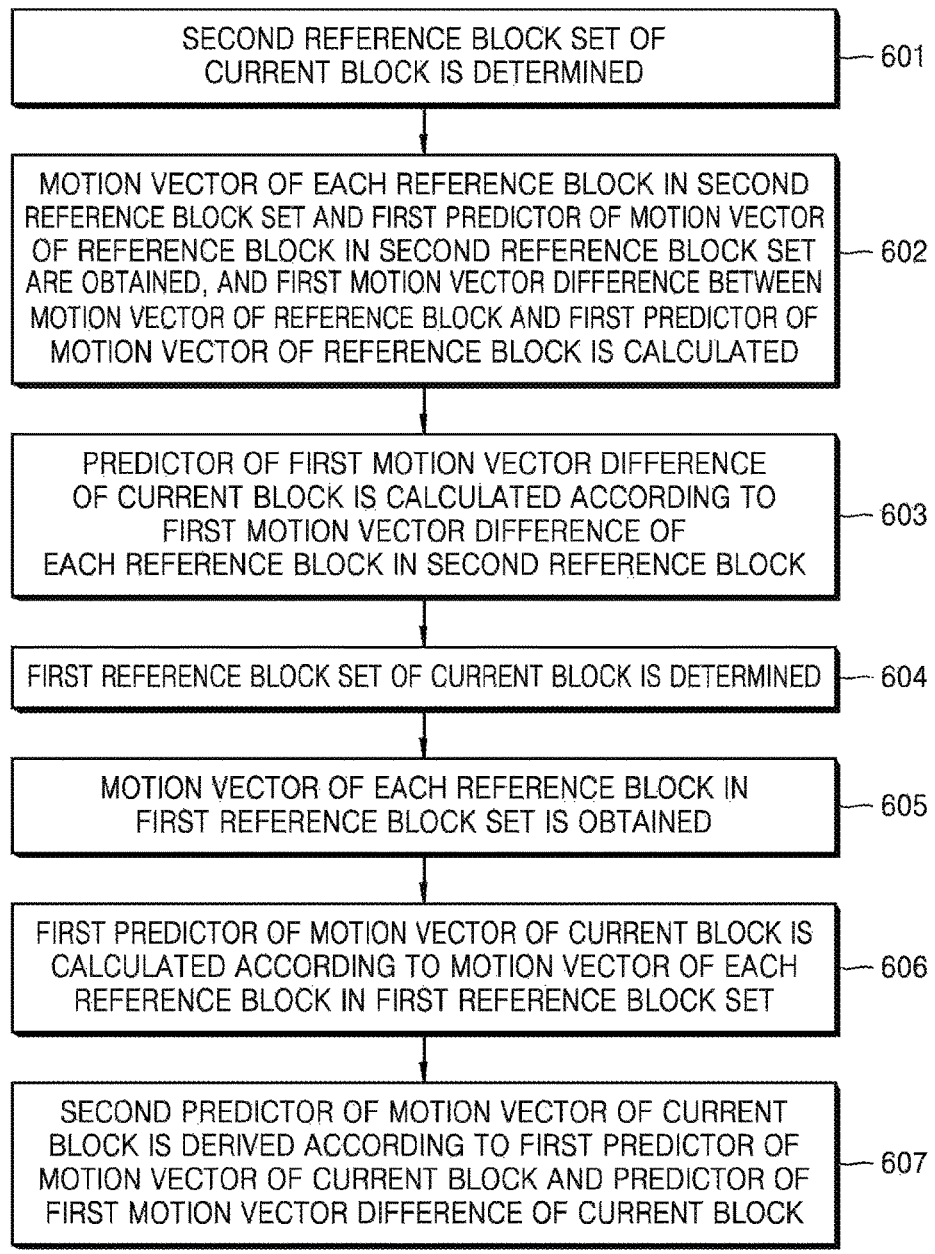
FIG. 6 is a flowchart of a third embodiment according to the present invention.

FIG. 6 is a flowchart of a third embodiment according to the present invention. FIG. 5 is a schematic diagram illustrating reference blocks of a second category of a current block, according to an embodiment of the present invention. As illustrated in FIG. 6, a method for obtaining motion information is implemented as follows.

At block 601, a second reference block set of the current block is determined.

Block 601 may be implemented as follows. The second reference block set only includes reference blocks of the second category. As illustrated in FIG. 5, the reference blocks of the second category of the current block include B1, B2, B3, B4, B5, B6, and B7. B1, B2, B3, and B4 overlap the current block in space. B5, B6, and B7 are adjacent to the current block in space. In this embodiment, reference blocks in the second reference block set of the current block may include B1 covering a point that has the same space location as a center of the current block, B1 covering a point that has the same space location as the left upper vertex of the current block, and B4 covering a point that has the same space location as the right bottom vertex of the current block.

At block 602, a motion vector of each reference block in the second reference block set and a first predictor of the motion vector of the reference block in the second reference block set are obtained. A first motion vector difference between the motion vector of the reference block and the first predictor of the motion vector of the reference block is calculated.

Block 602 is similar to block 205 described in the first embodiment. When the motion vector of each reference block in the second reference block set and the first predictor of the motion vector of the reference block in the second reference block set are obtained at block 602, if a motion vector of a certain reference block or a first predictor of a motion vector of the reference block is inexistent, an indication for indicating that the first motion vector difference of the reference block is inexistent is returned.

Similar to the first embodiment, the scaling operation may be performed at block 602.

At block 603, a predictor of the first motion vector difference of the current block is calculated according to the first motion vector difference of each reference block in the second reference block set that is obtained at block 602.

At block 603, the first motion vector difference of the current block may be predicted according to a conventional method for predicting the motion vector.

Block 603 may be implemented as follows. A median among horizontal components of the first motion vector differences of reference blocks that are obtained at block 602 and a median among vertical components of the first motion vector differences of reference blocks that are obtained at block 602 are respectively taken as a horizontal component of the predictor of the first motion vector difference of the current block and a vertical component of the predictor of the first motion vector difference of the current block. If a first motion vector difference of a certain reference block is inexistent or is equal to zero, a zero vector is taken as the predictor of the first motion vector difference of the current block.

Block 603 may be implemented as follows. An encoder selects one of the existent first motion vector differences, which are obtained at block 602, as the predictor of the first motion vector difference of the current block. The encoder writes an index of the selected value to a bit-stream. A decoder selects a correct value according to the index in the bit-stream from the existent first motion vector differences that are obtained at block 602. The decoder takes the selected value as the predictor of the first motion vector difference of the current block. The index transmitted in the bit-stream may be taken as the derivation information of the predictor of the first motion vector difference of the current block mentioned in the method for transmitting derivation information in a bit-stream to calculate the predictor of the first motion vector difference in the description of FIG. 1.

Similar to the first embodiment, the scaling operation may be performed.

At block 604, a first reference block set of a current block is determined.

Block 604 may be implemented as follows. The first reference block set only includes the reference blocks of the second category. As illustrated in FIG. 5, the reference blocks of the second category of the current block include B1, B2, B3, B4, B5, B6, and B7. B1, B2, B3, and B4 overlap the current block in space. B5, B6, and B7 are adjacent to the current block in space. In this embodiment, the reference blocks in the second reference block set of the current block may include B1 covering a point that has the same space location as the left upper vertex of the current block and B4 covering a point that has the same space location as the right bottom vertex of the current block.

At block 605, a motion vector of each reference block in the first reference block set is obtained.

When the motion vector of each reference block in the first reference block set is obtained at block 605, if the motion vector of a certain reference block in the first reference block set is inexistent, an indication for indicating that the motion vector of the reference block is inexistent is returned.

At block 606, a first predictor of the motion vector of the current block is calculated according to the motion vector of each reference block in the first reference block set that is obtained at block 605.

The first predictor of the motion vector of the current block may be calculated according to the same method for predicting or deriving a motion vector of a current block as that used in a conventional encoding/decoding method.

Block 606 may be implemented as follows. The encoder selects one of existent motion vectors as the first predictor of the first motion vector difference. The encoder writes an index of the selected value to a bit-stream. A decoder selects a correct value according to the index in the bit-stream from the existent motion vectors that are obtained at block 605. The decoder takes the selected value as the first predictor of the motion vector of the current block. If a motion vector of a certain reference block in the first reference block set is inexistent, the inexistent motion vector of the reference block is set to a zero vector. The index transmitted in the bit-stream may be taken as the derivation information of the first predictor of the motion vector of the current block mentioned in the method for transmitting derivation information in a bit-stream to calculate the first predictor of the motion vector in the description of FIG. 1.

Similar to the first embodiment, the scaling operation may be performed at block 606.

At block 607, a second predictor of the motion vector of the current block is derived according to the first predictor of the motion vector of the current block and the predictor of the first motion vector difference of the current block.

Block 607 is the same as block 207 described in the first embodiment.

After the second predictor of the motion vector of the current block is determined at block 607, the second predictor of the motion vector of the current block may be taken as the predictor of the motion vector of the current block, a candidate of the predictor of the motion vector of the current block, the motion vector of the current block, or a candidate of the motion vector of the current block, which may be used for encoding/decoding of the current block.

The method flowchart provided in the third embodiment ends.

The fourth embodiment is described as follows.

Figure 7:
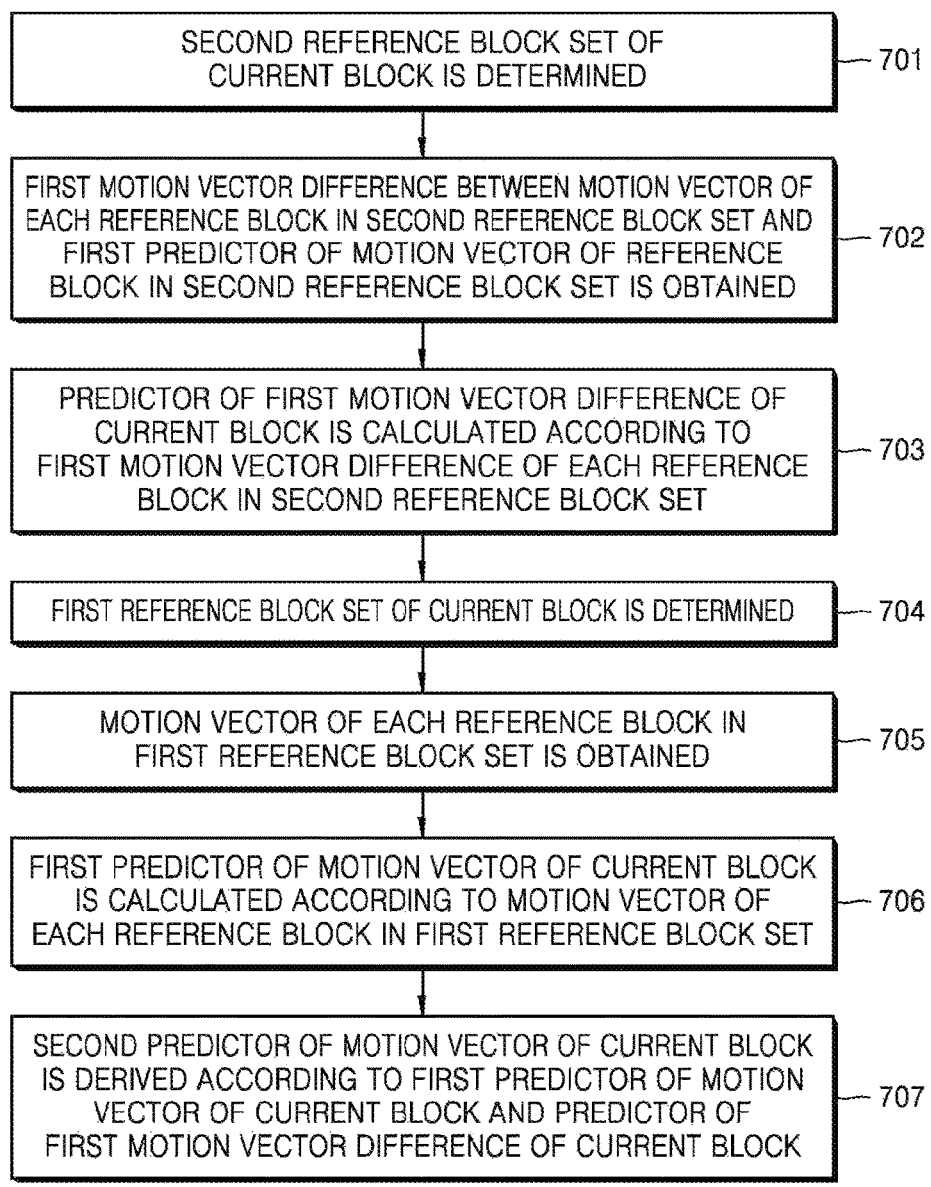
FIG. 7 is a flowchart of a fourth embodiment according to the present invention.

FIG. 7 is a flowchart of the fourth embodiment according to the present invention. FIG. 3 is a schematic diagram illustrating reference blocks of a first category of a current block, according to an embodiment of the present invention. FIG. 5 is a schematic diagram illustrating reference blocks of a second category of a current block, according to an embodiment of the present invention. As illustrated in FIG. 7, a method for obtaining motion information is implemented as follows.

At block 701, a second reference block set of the current block is determined.

Block 701 may be implemented as follows. The second reference block set only includes reference blocks of the second category. As illustrated in FIG. 5, the reference blocks of the second category of the current block include B1, B2, B3, B4, B5, B6, and B7. B1, B2, B3, and B4 overlap the current block in space. B5, B6, and B7 are adjacent to the current block in space. In this embodiment, reference blocks in the second reference block set of the current block may include an upper block B1 covering a point that has the same space location as the left upper vertex of the current block, a left block B1 covering a point that has the same space location as the left upper vertex of the current block, and a left upper block B1 including a point located at the same space as the left upper vertex of the current block.

At block 702, a first motion vector difference between a motion vector of each reference block in the second reference block set and a first predictor of the motion vector of the reference block in the second reference block set is obtained.

Block 702 is similar to block 405 described in the second embodiment. When the first motion vector difference of each reference block in the second reference block set is obtained at block 702, if a first motion vector difference of a certain reference block in the second reference block set is inexistent, an indication for indicating that the first motion vector difference of the reference block is inexistent is returned.

Similar to the first embodiment, the scaling operation may be performed at block 702.

At block 703, a predictor of the first motion vector difference of the current block is calculated according to the first motion vector difference of each reference block in the second reference block set that is obtained at block 702.

At block 703, the predictor of the first motion vector difference of the current block may be calculated according to a conventional method for predicting the motion vector.

Block 703 may be implemented as follows. The first motion vector difference that is returned by the upper block at block 702 is decoded into mvd_U, the first motion vector difference that is returned by the left block is decoded into mvd_L, and the first motion vector difference that is returned by the left upper block is decoded into mvd_LU. A distance between each two of mvd_L, mvd_U, and mvd_LU is calculated. That is, d12=|mvd_L−mvd_U|, d13=|mvd_L−mvd_LU|, and d23=|mvd_U−mvd_LU|. If d12 is a minimum value among d12, d13, and d23, mvd_LU is taken as the predictor of the first motion vector difference of the current block. If d13 is a minimum value among d12, d13, and d23, mvd_U is taken as the predictor of the first motion vector difference of the current block. If d23 is a minimum value among d12, d13, and d23, mvd_L is taken as the predictor of the first motion vector difference of the current block. When a first motion vector difference of a certain reference block is existent and is equal to zero, the predictor of the first motion vector difference of the current block is set to a zero vector.

Similar to the first embodiment, the scaling operation may be performed.

At block 704, a first reference block set of a current block is determined.

Block 704 may be implemented as follows. The first reference block set includes the reference blocks of the first category and the reference blocks of the second category. As illustrated in FIG. 3, the reference blocks of the first category of the current block include AL1, AL2, AU1, AU2, AU3, AC1, and AC2. As illustrated in FIG. 5, the reference blocks of the second category of the current block include B1, B2, B3, B4, B5, B6, and B7. B1, B2, B3, and B4 overlap the current block in space. B5, B6, and B7 are adjacent to the current block in space. In this embodiment, reference blocks in the first reference block set of the current block may be configured as an adjacent block AU1 located above the left upper vertex of the current block, an adjacent block AL2 located at the left side of the left upper vertex of the current block, an adjacent block AC2 located at the left upper side of the left upper vertex of the current block, an adjacent block AU3 located at the right upper side of the right upper vertex of the current block. In this embodiment, reference blocks in the first reference block set of the current block may include an adjacent block AC2 located at the left upper side of the left upper vertex of the current block, an adjacent block AU3 located at the right upper side of the right upper vertex of the current block, an adjacent block AC1 located at the left bottom side of the left bottom vertex of the current block, and B1 that covers a point that has the same space location as a center of the current block.

At block 705, a motion vector of each reference block in the first reference block set is obtained.

When the motion vector of each reference block in the first reference block set is obtained at block 705, if the motion vector of a certain reference block in the first reference block set is inexistent, an indication for indicating that the motion vector of the reference block is inexistent is returned.

At block 706, a first predictor of the motion vector of the current block is calculated according to the motion vector of each reference block in the first reference block set that is obtained at block 705.

The first predictor of the motion vector of the current block may be calculated according to the same method for predicting or deriving a motion vector of a current block as that used in a conventional encoding/decoding method.

In this embodiment, block 706 may be implemented as follows. An average value of a motion vector mv1 of AC1, a motion vector mv2 of AC2, and a motion vector mv3 of AC3 is calculated and decoded into mva. If any one of mv1, mv2, and mv3 is inexistent, the inexistent one is set to a zero vector. A motion vector of B1 is decoded into mvb. The smaller one of mva and mvb is taken as the first predictor of the motion vector of the current block. If mvb is inexistent, mva is taken as the first predictor of the motion vector of the current block.

Similar to the second embodiment, after the motion vector of the current block and the first predictor of the motion vector of the current block are determined, a first motion vector difference of the current block is calculated. In this way, when the current block is taken as a reference block in the second reference block set of a subsequently processed block, the first motion vector difference of the reference block may be directly obtained.

Similar to the first embodiment, the scaling operation may be performed at block 706.

At block 707, a second predictor of the motion vector of the current block is derived according to the first predictor of the motion vector of the current block and the predictor of the first motion vector difference of the current block.

Block 707 is similar to block 207 described in the first embodiment.

After the second predictor of the motion vector of the current block is determined at block 707, the second predictor of the motion vector of the current block may be taken as the predictor of the motion vector of the current block, a candidate of the predictor of the motion vector of the current block, the motion vector of the current block, or a candidate of the motion vector of the current block, which may be used for encoding/decoding of the current block.

The method flowchart provided in this embodiment ends.

The fifth embodiment is described as follows.

Figure 8:
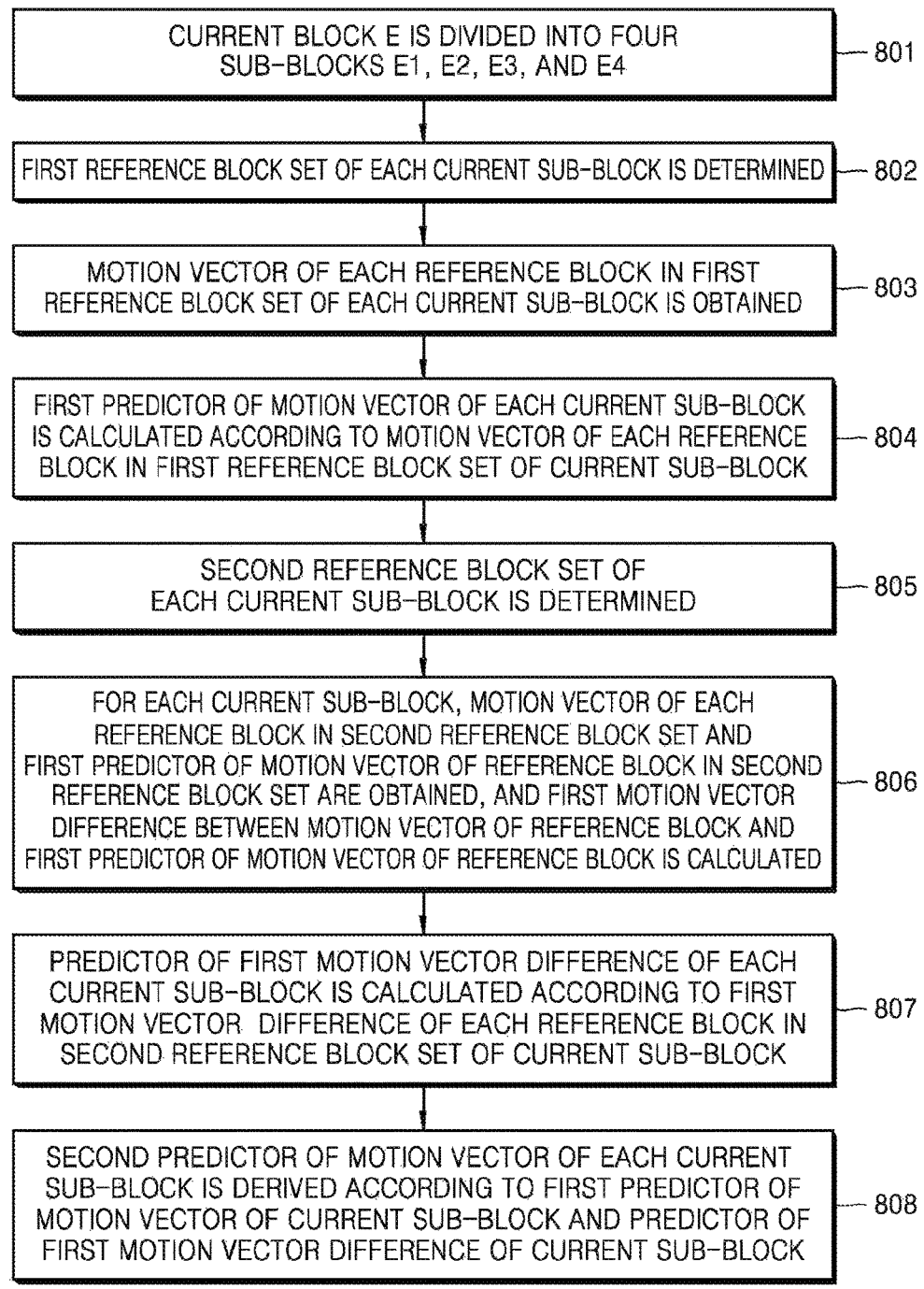
FIG. 8 is a flowchart of a fifth embodiment according to the present invention.
Figure 9:
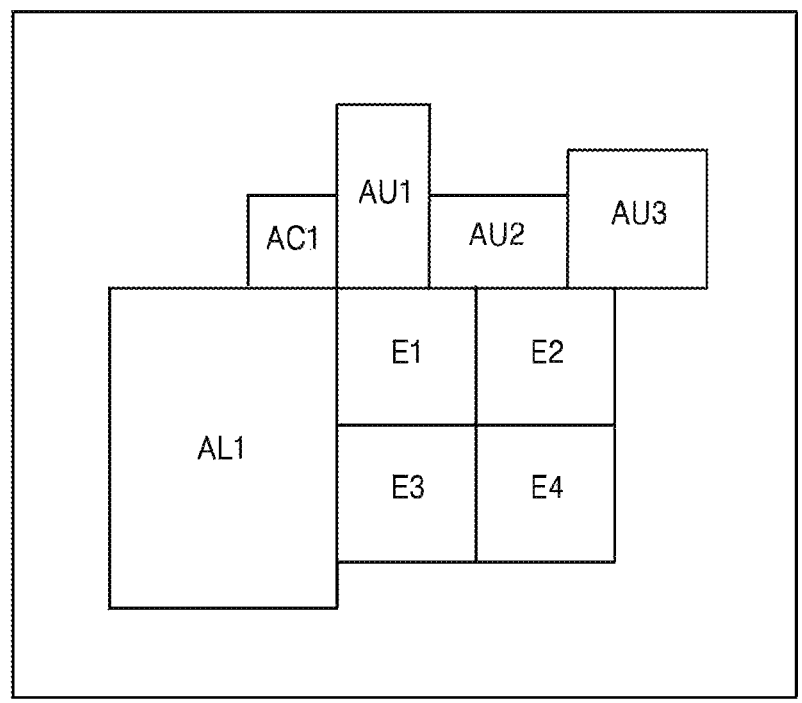
FIG. 9 is a schematic diagram illustrating reference blocks of a first category of a current block, according to another embodiment of the present invention.

FIG. 8 is a flowchart of the fifth embodiment of the present invention. FIG. 9 is a schematic diagram illustrating reference blocks of a first category of a current block, according to an embodiment of the present invention. FIG.

10 is a schematic diagram illustrating reference blocks of a second category of a current block, according to an embodiment of the present invention. As illustrated in FIG. 8, a method for obtaining motion information is implemented as follows.

At block 801, a current block E referenced in FIG. 9 is divided into four sub-blocks E1, E2, E3, and E4.

In this embodiment, the current block is divided into four sub-blocks. The motion information of each sub-block may be calculated according to the method described in the present invention. In this embodiment, the motion information of four sub-blocks is obtained according to the following blocks.

At block 802, a first reference block set of each current sub-block is determined.

For four different sub-blocks of the current block, reference blocks in the first reference block sets may be the same, or the same partially, or different completely.

Figure 10:
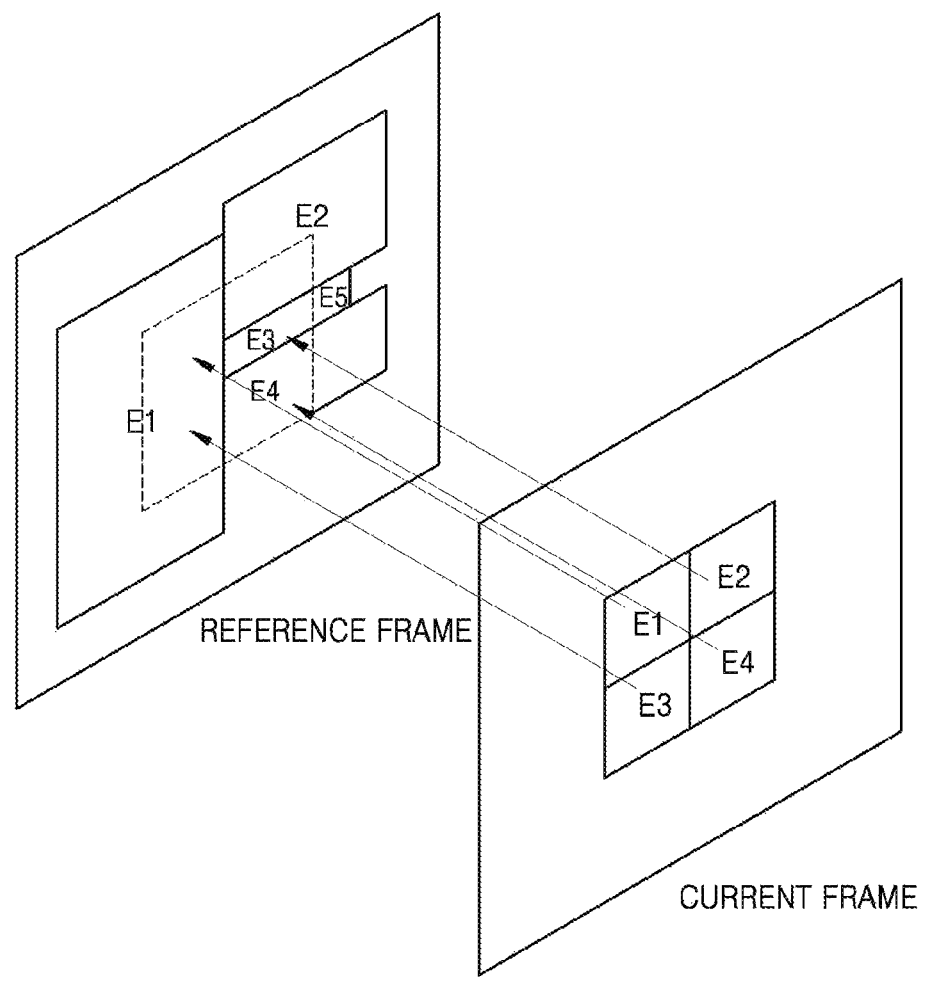
FIG. 10 is a schematic diagram illustrating reference blocks of a second category of a current block, according to another embodiment of the present invention.

Block 802 may be implemented as follows. The sub-blocks have different first reference block sets. However, all the first reference block sets only include the reference blocks of the second category. As illustrated in FIG. 10, reference blocks of the second category of E1, E2, E3, and E4 include B1, B2, B3, B4, and B5. In this embodiment, reference blocks in the first reference block set of the current sub-block may be configured as a block covering a point that has the same space location with a center of the current sub-block. That is to say, the first reference block set of E1 is B1, the first reference block set of E2 is B3, the first reference block set of E3 is B1, and the first reference block set of E4 is B4.

If motion information of a reference block A in the first reference block set of the current sub-block is determined in the sub-block, the reference block A is a sub-block. In other words, reference blocks in the first reference block set may be blocks or sub-blocks. If a single piece of motion information corresponds to a block, a corresponding reference block is a block. If a single piece of motion information corresponds to a sub-block, the corresponding reference block is a sub-block.

For example, a block A is an encoded block adjacent to the current sub-block. When the motion information of the block A is determined, the block A is divided into sub-blocks A1 and A2, and the motion information of the sub-block A1 and the motion information of the sub-block A2 are respectively calculated. A1 is adjacent to the current sub-block or the block of the current sub-block. A2 is not adjacent to the current sub-block and the block of the current sub-block. (Because the block A does not correspond to a single piece of motion information, but corresponds to the motion information of the sub-blocks A1 and A2). Because the sub-block A2 is not adjacent to the current sub-block and the block of the current sub-block, the sub-block A2 is not included in the first reference block set of the current sub-block.

At block 803, a motion vector of each reference block in the first reference block set of each current sub-block is obtained.

A method for obtaining the motion vector of each reference block in the first reference block set of each current sub-block may be the same as a conventional method. When the motion vector of each reference block in the first reference block set of each current sub-block is obtained at block 803, if a motion vector of a certain reference block in the first reference block set is inexistent, an indication for indicating that the motion vector of the reference block is inexistent is returned.

At block 804, a first predictor of a motion vector of each current sub-block is calculated according to the motion vector of each reference block in the first reference block set of the current sub-block that is obtained at block 803.

A method for determining the first predictor of the motion vector of the each current sub-block according to the motion vector of the reference block may be the same as a conventional method for predicting or deriving a motion vector. The methods of determining the first predictors of the motion vectors of the current sub-blocks may be the same or different. Block 804 may be implemented as follows. The motion vector of reference block in the first reference block set of each current sub-block may be directly taken as the first predictor of the motion vector of the current sub-block. If the reference block in the first reference block set of a certain current sub-block has no motion vector, the first predictor of the motion vector of the current sub-block is set to a zero vector, or the second predictor of the motion vector of the current sub-block is derived in other ways and without executing blocks 805 to 808 and then may be taken as the predictor of the motion vector of the current sub-block, a candidate of the predictor of motion vector of the current sub-block, the motion vector of the current sub-block, or a candidate of the motion vector of the current sub-block.

Similar to block 203, the motion vector of reference block in the first reference block set of each current sub-block may be scaled.

At block 805, a second reference block set of each current sub-block is determined.

The second reference block set of each current sub-block is determined according to actual requirements. Block 805 may be implemented as follows. E1, E2, E3 and E4 have the same second reference block set. The second reference block set only includes the reference blocks of the first category. As illustrated in FIG. 9, the reference blocks of the first category of E1, E2, E3, and E4 include AL1, AC1, AU1, AU2, and AU3. In this embodiment, reference blocks in the first reference block set of E1, E2, E3, and E4 may include a block AL1 located at the left side of the left upper vertex of E1, a block AU1 located above the left upper vertex of E1, and a block AC1 located at a left upper side of the left upper vertex of E1. If the block AL1 located at the left side of the left upper vertex of E1 has no motion vector, the block AL1 located at the left side of the left upper vertex of E1 is replaced with the block AL1 located at the left side of the left upper vertex of E3. If the block AU1 located above the left upper vertex of E1 has no motion vector, the block AU1 located above the left upper vertex of E1 is replaced with the block AU2 located above the left upper vertex of E2.

At block 806, for each current sub-block, a motion vector of each reference block in the second reference block set and a first predictor of the motion vector of the reference block in the second reference block set are obtained. A first motion vector difference between the motion vector of the reference block and the first predictor of the motion vector of the reference block is calculated.

Block 806 is similar to block 205 described in the first embodiment, but differs from block 205 in that each current sub-block is processed respectively. However, since the second reference block sets of all the current sub-blocks in this embodiment are the same, the process only needs to be performed once. When the motion vector of each reference block in the second reference block set of each current sub-block and a first predictor of the motion vector of the reference block in the second reference block set of each current sub-block are obtained at block 806, if a motion vector of a certain reference block or the first predictor of the motion vector of the reference block is inexistent, an indication for indicating that the first motion vector difference of the reference block is inexistent is returned.

Similar to block 205, the motion vector of the reference block in the second reference block set and the first predictor of the motion vector of the reference block in the second reference block set may be scaled for each current sub-block at this block.

At block 807, a predictor of the first motion vector difference of each current sub-block is calculated according to the first motion vector difference of the each reference block in the second reference block set of the current sub-block that is calculated at block 806.

The predictors of the first motion vector differences of the current sub-blocks may be calculated through the same method or different methods. The calculation method may be determined according to actual requirements. For example, one of the methods mentioned in the above embodiments may be adopted. In this embodiment, block 807 may be implemented as follows. An average of the existent first motion vector differences of reference blocks in the second reference block set of the current sub-block may be taken as the predictor of the first motion vector difference of the current sub-block. If the first motion vector differences of reference blocks in the second reference block set of a certain current sub-block are all inexistent, the predictor of the first motion vector difference of the current sub-block may be set to a zero vector.

In addition, block 807 may be implemented as follows. An encoder selects one of the existent first motion vector differences of the reference blocks in the second reference block set of the current sub-block that are calculated at block 806, takes the selected value as the predictor of the first motion vector difference of the current sub-block, and writes an index of the selected value to a bit-stream. A decoder selects a correct value according to the index in the bit-stream from the existent first motion vector differences of the reference blocks in the second reference block set of the current sub-block that are calculated at block 806 and takes the selected value as the predictor of the first motion vector difference of the current sub-block. The index transmitted in the bit-stream may be taken as the derivation information of the predictor of the first motion vector difference of the current sub-block mentioned in the method for transmitting derivation information in a bit-stream to calculate the predictor of the first motion vector difference in the description of FIG. 1. The sub-blocks may share the predictor of the first motion vector difference. In this case, the calculation process of the predictor of the first motion vector difference only needs to be performed once for the whole current block E, and only one index of the first motion vector difference is transmitted in the bit-stream.

Similar to block 206 in the first embodiment, the first motion vector difference of the reference block in the second reference block set may be scaled for each current sub-block at this block.

At block 808, a second predictor of the motion vector of each current sub-block is derived according to the first predictor of the motion vector of the current sub-block and the predictor of the first motion vector difference of the current sub-block.

Block 808 is similar to block 207 described in the first embodiment, and differs from block 207 in that each current sub-block is processed respectively.

After the second predictor of the motion vector of the current sub-block is determined at block 808, the second predictor of the motion vector of the current sub-block may be taken as the predictor of the motion vector of the current sub-block, the candidate of the predictor of the motion vector of the current sub-block, the motion vector of the current sub-block, or the candidate of the motion vector of the current sub-block, which may be used for encoding/decoding processing of the current sub-block.

The method flowchart provided in this embodiment ends.

The sixth embodiment is as follows.

Figure 11:
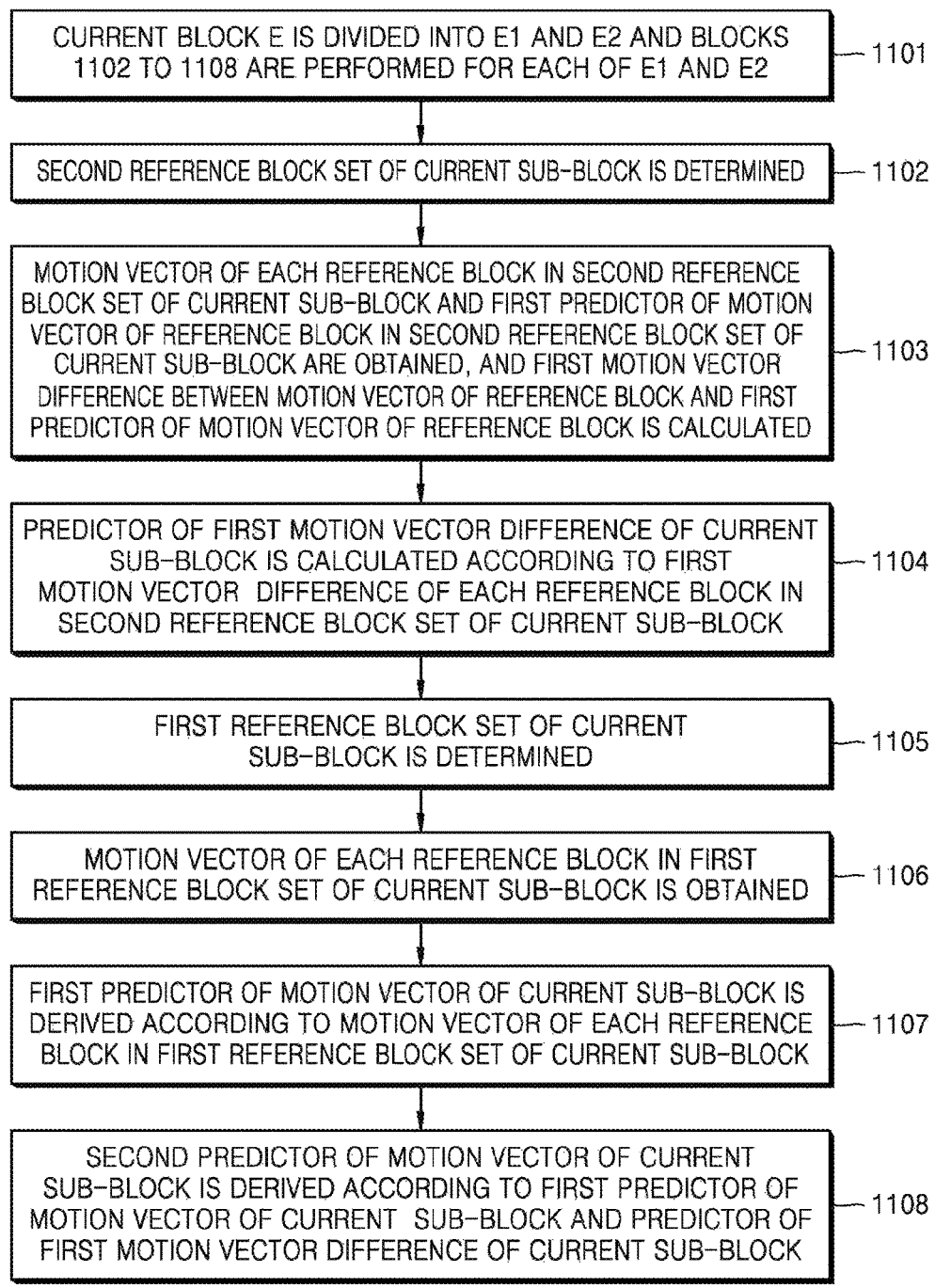
FIG. 11 is a flowchart of a sixth embodiment according to the present invention.
Figure 12:
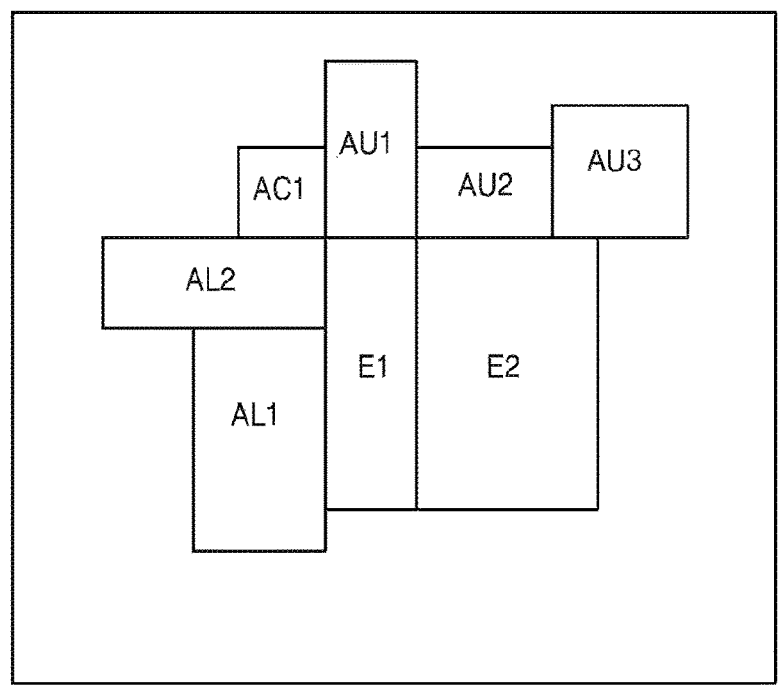
FIG. 12 is a schematic diagram illustrating reference blocks of a first category of a current block, according to another embodiment of the present invention.
Figure 13:
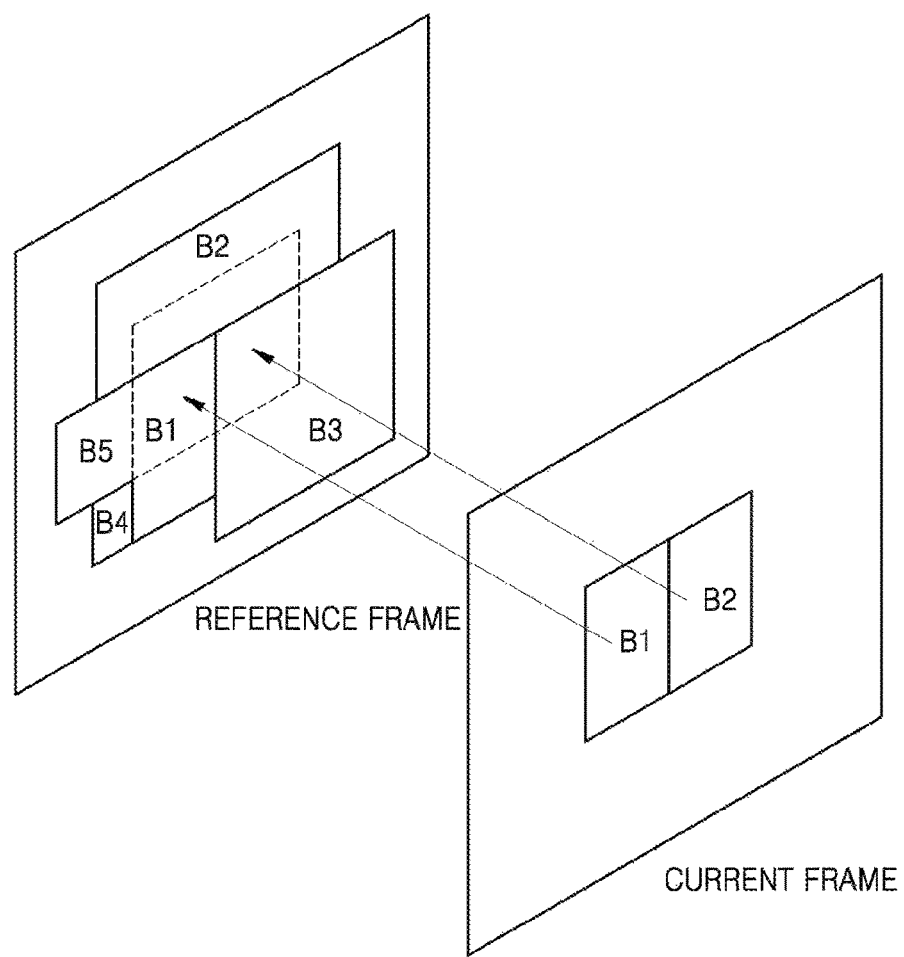
FIG. 13 is a schematic diagram illustrating reference blocks of a second category of a current block, according to another embodiment of the present invention.

FIG. 11 is a flowchart of the sixth embodiment of the present invention. FIG. 12 is a schematic diagram illustrating reference blocks of a first category of a current block, according to an embodiment of the present invention. FIG. 13 is a schematic diagram illustrating reference blocks of a second category of a current block, according to an embodiment of the present invention. As illustrated in FIG. 11, a method for obtaining motion information is implemented as follows.

At block 1101, the current block E is divided into E1 and E2.

As illustrated in FIG. 12, the current block is divided into E1 and E2. Following blocks 1102 to 1108 are performed for each of E1 and E2.

At block 1102, a second reference block set of a current sub-block is determined.

Block 1102 may be implemented as follows. E1 and E2 have different second reference block sets. However, each of the second reference block sets only includes the reference blocks of the second category. As illustrated in FIG. 13, the reference blocks of the second category of the E1 and E2 include B1, B2, B3, B4, and B5. B1, B2, and B3 overlap the block E in space. B4 and B5 are adjacent to the block E in space. In this embodiment, reference blocks in the first reference block set of the current sub-block may be configured as a block covering a point that has the same space location as a center of the current sub-block. For example, if the current sub-block is E1, B1 may be a reference block in the second reference block set of the current sub-block. If the current sub-block is E2, B3 may be a reference block in the second reference block set of the current sub-block.

At block 1103, a motion vector of each reference block in the second reference block set of the current sub-block and a first predictor of the motion vector of the reference block in the second reference block set of the current sub-block are obtained. A first motion vector difference between the motion vector of the reference block and the first predictor of the motion vector of the reference block is calculated.

When the motion vector of each reference block in the second reference block set of the current sub-block and the first predictor of the motion vector of the reference block in the second reference block set of the current sub-block are obtained at block 1103, if a motion vector of a certain reference block in the second reference block set or the first predictor of the motion vector of the reference block in the second reference block set is inexistent, an indication for indicating that the first motion vector difference of the reference block is inexistent is returned.

Similar to the above embodiments, the motion vector and the first motion vector difference may be scaled at this block.

At block 1104, a predictor of the first motion vector difference of the current sub-block is calculated according to the first motion vector difference of each reference block in the second reference block set of the current sub-block that is obtained at block 1103.

Block 1104 may be implemented as follows. The first motion vector difference of the reference block in the second reference block set of the current sub-block that is obtained at block 1103 may be directly taken as the predictor of the first motion vector difference of the current sub-block. If a first motion vector difference of a certain reference block in the second reference block set is inexistent, the predictor of the first motion vector difference of the current sub-block is set to a zero vector.

Similar to the above embodiments, the first motion vector difference may be scaled at this block.

At block 1105, a first motion vector difference of a current sub-block is determined.

Block 1105 may be implemented as follows. E1 and E2 have different first reference block sets. However, each of the first reference block sets only includes the reference blocks of the first category. As illustrated in FIG. 12, the reference blocks of the first category of E1 and E2 include AL1, AL2, AC1, AU1, AU2, and AU3. In this embodiment, reference blocks in the first reference block set of the current sub-block may include a block located at the left side of the left upper vertex of the current sub-block and a block located above the left upper vertex of the current sub-block. For example, if the current sub-block is E1, AL2 and AU1 are reference blocks in the first reference block set of the current sub-block. If the current sub-block is E2, E1 and AU2 are reference blocks in the first reference block set of the current sub-block.

At block 1106, a motion vector of each reference block in the first reference block set of the current sub-block is obtained.

When the motion vector of each reference block in the first reference block set of the current sub-block is obtained at block 1106, if a motion vector of a certain reference blocks in the first reference block set is inexistent, an indication for indicating that the motion vector of the reference block is inexistent is returned.

At block 1107, a first predictor of the motion vector of the current sub-block is obtained according to the motion vector of each reference block in the first reference block set of the current sub-block that is obtained at block 1106.

Block 1107 may be implemented as follows. A minimum value among motion vectors of reference blocks in the first reference block set of the current sub-block may be taken as the first predictor of the motion vector of the current sub-block. If the motion vectors of reference blocks in the first reference block set of the current sub-block are all inexistent, the first predictor of the motion vector of the current sub-block is set to a zero vector.

Similar to the above embodiments, the motion vectors of the reference blocks in the first reference block set may be scaled at this block.

At block 1108, a second predictor of the motion vector of each current sub-block is obtained according to the first predictor of the motion vector of the current sub-block and the predictor of the first motion vector difference of the current sub-block.

Block 1108 is similar to block 207 described in the first embodiment. Block 1108 differs from block 207 in that the process is performed on the current sub-block.

After the second predictor of the motion vector of the current sub-block is obtained at block 1108, the second predictor of the motion vector of the current sub-block may be taken as the predictor of the motion vector of the current sub-block, a candidate of predictor of the motion vector of the current sub-block, the motion vector of the current sub-block, or a candidate of the motion vector of the current sub-block, which may be used for encoding/decoding processing of the current sub-block.

The method flowchart in this embodiment ends. This embodiment differs from the fifth embodiment in that the sub-blocks in the current block are serially processed in this embodiment, but the sub-blocks in the current block are processed in parallel in the fifth embodiment.

The seventh embodiment is described as follows.

Figure 14:
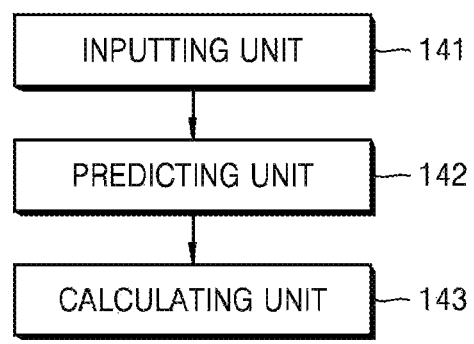
FIG. 14 is a schematic diagram illustrating an apparatus for obtaining motion information according to an embodiment of the present invention.
Figure 15:
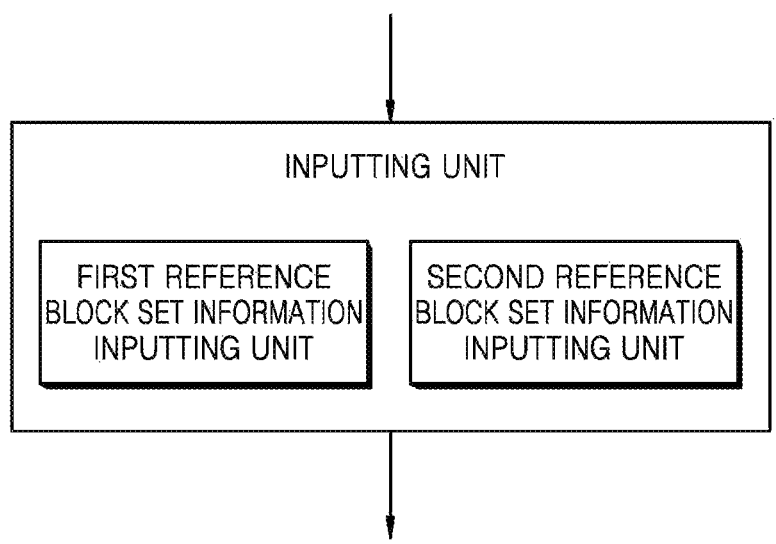
FIG. 15 is a schematic diagram illustrating the structure of an inputting unit in the apparatus, according to an embodiment of the present invention.
Figure 16:
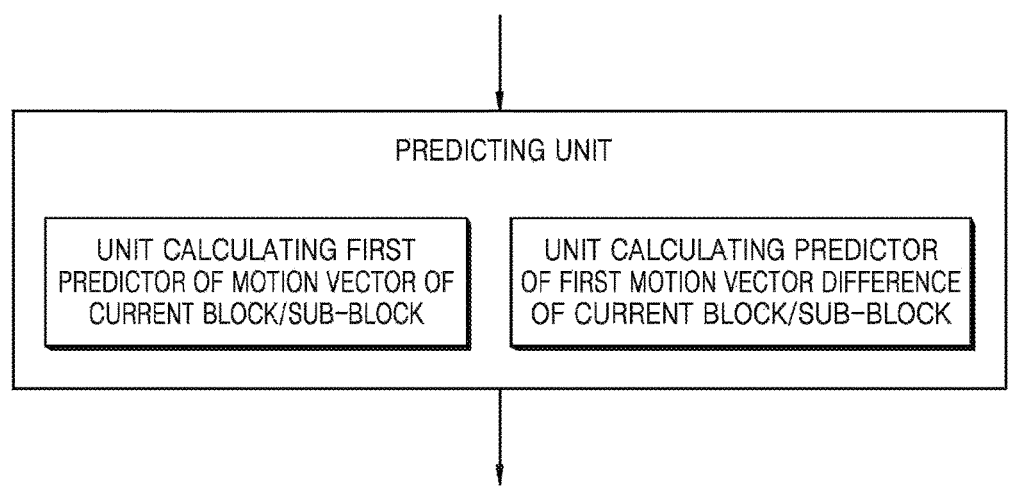
FIG. 16 is a schematic diagram illustrating the structure of a predicting unit in the apparatus, according to an embodiment of the present invention.

FIG. 14 is a schematic diagram illustrating an apparatus for obtaining motion information according to an embodiment of the present invention. FIG. 15 is a schematic diagram illustrating an inputting unit of the apparatus, according to an embodiment of the present invention. FIG. 16 is a schematic diagram illustrating a predicting unit of the apparatus, according to an embodiment of the present invention. As illustrated in FIG. 14, the apparatus for obtaining motion information in an encoder/decoder or a video encoding/decoding system is provided according to an embodiment. The apparatus includes an inputting unit 141, a predicting unit 142, and a calculating unit 143.

The inputting unit 141 inputs motion information of reference blocks in a first reference block set and a second reference block set of a current block/sub-block. The inputting unit 141 may be implemented as follows. As illustrated in FIG. 15, the inputting unit 141 includes a first reference block set information inputting unit and a second reference block set information inputting unit. The first reference block set information inputting unit inputs a motion vector of a reference block in the first reference block set of the current block/sub-block. The second reference block set information inputting unit inputs a first motion vector difference between a motion vector of a reference block in the second reference block set of the current block/sub-block and a first predictor of the motion vector of the reference block in the second reference block set of the current block/sub-block. Alternatively, the second reference block set information inputting unit inputs a motion vector of a reference block in the second reference block set of the current block/sub-block and first prediction information of the motion vector of the reference block in the second reference block set of the current block/sub-block and calculates a first motion vector difference of the reference block in the second reference block set of the current block/sub-block.

The predicting unit 142 calculates the first predictor of the motion vector of the current block/sub-block and a predictor of the first motion vector difference of the current block/sub-block. The predicting unit 142 may be implemented as follows. As illustrated in FIG. 16, the predicting unit 142 includes a unit calculating the first predictor of the motion vector of the current block/sub-block and a unit calculating the predictor of the first motion vector difference of the current block/sub-block.

The calculating unit 143 calculates a second predictor of the motion vector of the current block/sub-block according to the first predictor of the motion vector of the current block/sub-block and the predictor of the first motion vector difference of the current block/sub-block. After the second predictor of the motion vector of the current block/sub-block is obtained, the calculating unit 143 may take the second predictor of the motion vector of the current block/sub-block as the predictor of the motion vector of the current block/sub-block, a candidate of the predictor of the motion vector of the current block/sub-block, the motion vector of the current block/sub-block, or a candidate of the motion vector of the current block/sub-block, which may be used for encoding/decoding the current block/sub-block.

As can be seen from the above solutions of the present invention, the motion vector of the current block/sub-block is predicted according to the reference blocks in the first reference block set so as to obtain the first predictor of the motion vector of the current block/sub-block. Then, the first motion vector difference of the current block/sub-block is predicted according to the reference blocks in the second reference block set so as to obtain the predictor of the first motion vector difference of the current block/sub-block. Finally, the second predictor of the motion vector of the current block/sub-block is obtained according to the first predictor of the motion vector of the current block/sub-block and the predictor of the first motion vector difference of the current block/sub-block. The second predictor may be taken as the predictor of the motion vector of the current block/sub-block, a candidate of the predictor of the motion vector of the current block/sub-block, the motion vector of the current block/sub-block, or a candidate of the motion vector of the current block/sub-block, which may be used for encoding/decoding the current block/sub-block. However, in the conventional technologies, the first predictor of the motion vector is taken as the final predictor of the motion vector of the current block/sub-block, a candidate of the predictor of the motion vector of the current block/sub-block, the motion vector of the current block/sub-block, or a candidate of the motion vector of the current block/sub-block. Based on the conventional method for predicting the motion vector, the secondary prediction of the motion vector is introduced. The accuracy of the predicted or derived motion vector may be improved through the predictor of the motion vector difference. For the first encoding/decoding method mentioned in the background art, because the accuracy of the predictor of the motion vector is improved, the motion vector difference to be transmitted is decreased. Therefore, the compression efficiency of the motion vector is improved. For the second encoding/decoding method mentioned in the background art, because the optimized motion vector is derived, the video coding performance may be improved. When the first reference block set only includes the reference blocks of the first category and the second reference block set only includes the reference blocks of the second category or when the first reference block set only includes the reference blocks of the second category and the second reference block set only includes the reference blocks of the first category, the correlation of motion vector both in space-domain and in time-domain may be eliminated without increasing the complexity of two predictions. That is, a larger coding performance gain may be obtained with relative smaller costs.

The foregoing is only preferred embodiments of the present invention and is not used to limit the protection scope of the present invention. Any modification, equivalent substitution, and improvement without departing from the spirit and principle of the present invention are within the protection scope of the present invention.

The invention claimed is:

1. A method for obtaining motion information in video decoding, comprising a process, performed by a computing processor, of determining motion information of a current block/sub-block in a video image, wherein the process comprises:

calculating, by the computing processor, a first predictor of a motion vector of the current block/sub-block according to a motion vector of each reference block in a first reference block set of the current block/sub-block;

determining, by the computing processor, a first motion vector difference between a motion vector of each reference block in a second reference block set of the current block/sub-block and a first predictor of the motion vector of the reference block in the second reference block set of the current block/sub-block, and predicting a first motion vector difference between the motion vector of the current block/sub-block and the first predictor of the motion vector of the current block/sub-block according to the first motion vector difference of each reference block in the second reference block set so as to obtain a predictor of the first motion vector difference of the current block/sub-block; and determining, by the computing processor, a second predictor of the motion vector of the current block/sub-block according to the predictor of the first motion vector difference of the current block/sub-block and the first predictor of the motion vector of the current block/sub-block, wherein the first reference block set comprises reference blocks for predicting or deriving the motion vector of the current block/sub-block for a first time, and the second reference block set comprises reference blocks for predicting the first motion vector difference of the current block/sub-block.

2. The method of claim 1, wherein the first reference block set of the current block comprises a decoded block on a current frame that is adjacent to the current block, or a decoded block on a reference frame of the current frame that overlap or is adjacent to the current block in space;

the second reference block set of the current block comprises a decoded block on the current frame that is adjacent to the current block, or a decoded block on the reference frame of the current frame that overlaps or is adjacent to the current block in space;

the first reference block set of the current sub-block comprises a decoded block on the current frame that is adjacent to the current sub-block or the block of the current sub-block, or a decoded block on the reference frame of the current frame that overlaps or is adjacent to the current sub-block or the block of the current sub-block in space; and the second reference block set of the current sub-block comprises a decoded block on the current frame that is adjacent to the current sub-block or the block of the current sub-block, or a decoded block on the reference frame of the current frame that overlaps or is adjacent to the current sub-block or the block of the current sub-block in space.

3. The method of claim 1, wherein the calculating of the first predictor of the motion vector of the current block/sub-block comprises:

deriving, by the computing processor, the first predictor of the motion vector of the current block/sub-block according to the motion vector of each reference block in the first reference block set of the current block/sub-block and derivation information of the first predictor of the motion vector of the current block/sub-block in a bit-stream.

4. The method of claim 1, wherein the determining, by the computing processor, of the first motion vector difference between the motion vector of each reference block in the second reference block set of the current block/sub-block and the first predictor of the motion vector of the reference block in the second reference block set of the current block/sub-block comprises:

when the motion information of the current block/sub-block is determined, obtaining, by the computing processor, the motion vector of each reference block in the second reference block set and the first predictor of the motion vector of the reference block in the second reference block set, and taking, by the computing processor, a difference between the motion vector of the reference block in the second reference block set and the first predictor of the motion vector of the reference block in the second reference block set as the first motion vector difference of the reference block in the second reference block set of the current block/sub-block;

for each reference block in the second reference block set of the current block/sub-block, after motion information of the reference block is determined and before motion information of a following processed block/sub-block of the reference block is determined, taking, by the computing processor, a difference between a motion vector of the reference block and a first predictor of the motion vector of the reference block as the first motion vector difference of the reference block and storing, in a memory, the first motion vector difference of the reference block; and when the motion information of the current block/sub-block is determined, obtaining, by the computing processor, the stored first motion vector difference of each reference block in the second reference block set.

5. The method of claim 4, wherein, when a motion vector of a reference block in the second reference block set of the current block/sub-block or a predictor of the motion vector of the reference block in the second reference block set of the current block/sub-block is inexistent, the method comprises:

determining, by the computing processor, that a first motion vector difference of the reference block is inexistent, when the first motion vector difference of the reference block is not to be used for calculating the predictor of the first motion vector difference of the current block/sub-block; or configuring, by the computing processor, the first motion vector difference of the reference block as a zero vector, when the first motion vector difference of the reference block is to be used for calculating the predictor of the first motion vector difference of the current block/sub-block.

6. The method of claim 5, wherein when a first motion vector difference of a reference block in the second reference block set of the current block/sub-block is inexistent, the method comprises configuring, by the computing processor, the predictor of the first motion vector difference of the current block/sub-block as a zero vector; or when first motion vector differences of all reference blocks in the second reference block set of the current block/sub-block are inexistent, the method comprises configuring, by the computing processor, the predictor of the first motion vector difference of the current block/sub-block as a zero vector.

7. The method of claim 1, wherein the predicting of the first motion vector difference of the current block/sub-block comprises:

taking, by the computing processor, a minimum value among horizontal components of first motion vector differences of the reference blocks in the second reference block set as a horizontal component of the predictor of the first motion vector difference of the current block/sub-block, and taking a minimum value among vertical components of the first motion vector differences of the reference blocks in the second reference block set as a vertical component of the predictor of the first motion vector difference of the current block/sub-block; or taking, by the computing processor, an average of first motion vector differences of the reference blocks in the second reference block set as the predictor of the first motion vector difference of the current block/sub-block; or taking, by the computing processor, a median among the horizontal components of the first motion vector differences of the reference blocks in the second reference block set as the horizontal component of the predictor of the first motion vector difference of the current block/sub-block, and taking a median among the vertical components of the first motion vector differences of the reference blocks in the second reference block set as the vertical component of the predictor of the first motion vector difference of the current block/sub-block; or calculating, by the computing processor, a distance between each two of first motion vector differences of the reference blocks in the second reference block set, and deriving the predictor of the first motion vector difference of the current block/sub-block according to calculated distances; or deriving, by the computing processor, the predictor of the first motion vector difference of the current block/sub-block according to the first motion vector difference of each reference block in the second reference block set and derivation information of the predictor of the first motion vector difference of the current block/sub-block in a bit-stream.

8. The method of claim 1, wherein the determining of the second predictor of the motion vector of the current block/sub-block comprises taking, by the computing processor, a sum of the predictor of the first motion vector difference of the current block/sub-block and the first predictor of the motion vector of the current block/sub-block or a weighted sum of the predictor of the first motion vector difference of the current block/sub-block and the first predictor of the motion vector of the current block/sub-block as the second predictor of the motion vector of the current block/sub-block.

9. The method of claim 1, wherein the reference blocks in the first reference block set of the current block/sub-block are equal to or different from the reference blocks in the second reference block set of the current block/sub-block.

10. The method of claim 1, wherein, for different sub-blocks within a block, reference blocks in a first reference block set of a sub-block are equal to or different from reference blocks in a first reference block set of another sub-block, and reference blocks in a second reference block set of a sub-block are equal to or different from reference blocks in a second reference block set of another sub-block.

11. The method of claim 1, wherein, when motion information of a reference block in the first reference block set or the second reference block set is determined in sub-block, the reference block is a sub-block.

12. An apparatus for obtaining motion information in video decoding, comprising a computing processor configured to:

obtain a motion vector of each reference block in a first reference block set of a current block/sub-block, and determines a first motion vector difference between a motion vector of each reference block in a second reference block set of the current block/sub-block and a first predictor of the motion vector of the reference block in the second reference block set of the current block/sub-block, and calculate the first predictor of the motion vector of the current block/sub-block according to the motion vector of each reference block in the first reference block set, and predicts the first motion vector difference of the current block/sub-block according to the first motion vector difference of each reference block in the second reference block set so as to obtain the predictor of the first motion vector difference of the current block/sub-block, and determine a second predictor of the motion vector of the current block/sub-block according to the predictor of the first motion vector difference of the current block/sub-block and the first predictor of the motion vector of the current block/sub-block, wherein the first reference block set comprises reference blocks for predicting or deriving a motion vector of the current block/sub-block for a first time, the second reference block set comprises reference blocks for predicting a first motion vector difference of the current block/sub-block.

13. A method for obtaining motion information in video encoding, comprising a process, performed by a computing processor, of determining motion information of a current block/sub-block in a video image, wherein the process comprises:

calculating, by the computing processor, a first predictor of a motion vector of the current block/sub-block according to a motion vector of each reference block in a first reference block set of the current block/sub-block;

determining, by the computing processor, a first motion vector difference between a motion vector of each reference block in a second reference block set of the current block/sub-block and a first predictor of the motion vector of the reference block in the second reference block set of the current block/sub-block, and predicting a first motion vector difference between the motion vector of the current block/sub-block and the first predictor of the motion vector of the current block/sub-block according to the first motion vector difference of each reference block in the second reference block set so as to obtain a predictor of the first motion vector difference of the current block/sub-block; and determining, by the computing processor, a second predictor of the motion vector of the current block/sub-block according to the predictor of the first motion vector difference of the current block/sub-block and the first predictor of the motion vector of the current block/sub-block, wherein the first reference block set comprises reference blocks for predicting or deriving the motion vector of the current block/sub-block for a first time, and the second reference block set comprises reference blocks for predicting the first motion vector difference of the current block/sub-block.

14. The method of claim 13, wherein the calculating of the first predictor of the motion vector of the current block/sub-block comprises:

deriving, by the computing processor, the first predictor of the motion vector of the current block/sub-block according to the motion vector of each reference block in the first reference block set of the current block/sub-block, and writing derivation information of the first predictor of the motion vector of the current block/sub-block to a bit-stream.

15. The method of claim 13, wherein the predicting of the first motion vector difference of the current block/sub-block comprises:

taking, by the computing processor, a minimum value among horizontal components of first motion vector differences of the reference blocks in the second reference block set as a horizontal component of the predictor of the first motion vector difference of the current block/sub-block, and taking a minimum value among vertical components of the first motion vector differences of the reference blocks in the second reference block set as a vertical component of the predictor of the first motion vector difference of the current block/sub-block; or taking, by the computing processor, an average of first motion vector differences of the reference blocks in the second reference block set as the predictor of the first motion vector difference of the current block/sub-block; or taking, by the computing processor, a median among horizontal components of first motion vector differences of the reference blocks in the second reference block set as a horizontal component of the predictor of the first motion vector difference of the current block/sub-block, and taking a median among vertical components of the first motion vector differences of the reference blocks in the second reference block set as a vertical component of the predictor of the first motion vector difference of the current block/sub-block; or calculating, by the computing processor, a distance between each two of first motion vector differences of the reference blocks in the second reference block set, and deriving the predictor of the first motion vector difference of the current block/sub-block according to calculated distances; or deriving, by the computing processor, the predictor of the first motion vector difference of the current block/sub-block according to the first motion vector difference of each reference block in the second reference block set, writing derivation information of the predictor of the first motion vector difference of the current block/sub-block to a bit-stream.

* * * * *